United States Patent
Gouzman et al.

(10) Patent No.: US 6,278,441 B1
(45) Date of Patent: Aug. 21, 2001

(54) TACTILE INTERFACE SYSTEM FOR ELECTRONIC DATA DISPLAY SYSTEM

(75) Inventors: Roman Gouzman; Igor Karasin, both of Jerusalem (IL)

(73) Assignee: Virtouch, Ltd., Jerusalem (IL)

( * ) Notice: Subject to any disclaimer, the term of this patent is extended or adjusted under 35 U.S.C. 154(b) by 0 days.

(21) Appl. No.: 09/332,830

(22) Filed: Jun. 14, 1999

Related U.S. Application Data

(63) Continuation-in-part of application No. 08/781,017, filed on Jan. 9, 1997, now Pat. No. 5,912,660.

(51) Int. Cl.[7] .............. G09G 5/08; G06K 9/00; G09B 21/00; H04Q 23/02
(52) U.S. Cl. ............. 345/163; 340/825.19; 382/114; 434/114
(58) Field of Search .............. 345/156, 157, 345/163, 173, 145, 108; 340/825.19, 407.1, 407.2; 434/112, 113, 114; 341/21; 463/30; 382/114

(56) References Cited

U.S. PATENT DOCUMENTS

| | | | |
|---|---|---|---|
| 4,881,900 | * 11/1989 | Matsuoka et al. | 434/113 |
| 4,985,692 | * 1/1991 | Breider et al. | 340/825.19 |
| 5,065,434 | * 11/1991 | Matsuoka et al. | 382/114 |
| 5,186,629 | * 2/1993 | Roden | 434/114 |
| 5,195,894 | * 3/1993 | Le Blanc et al. | 434/114 |
| 5,223,828 | * 6/1993 | McKiel, Jr. | 340/825.19 |
| 5,287,102 | * 2/1994 | McKiel, Jr. | 340/825.19 |
| 5,374,924 | * 12/1994 | McKiel, Jr. | 340/825.19 |
| 5,461,399 | * 10/1995 | Cragun | 345/145 |
| 5,588,839 | * 12/1996 | Shimoda | 434/114 |
| 5,636,038 | * 6/1997 | Lynt et al. | 340/407.2 |
| 5,714,978 | * 2/1998 | Yamanaka et al. | 345/157 |
| 5,736,978 | * 4/1998 | Hasser et al. | 345/173 |
| 5,912,660 | * 6/1999 | Gouzman et al. | 345/163 |
| 5,956,016 | * 9/1999 | Kuenzner et al. | 345/156 |
| 5,990,869 | * 11/1999 | Kubica et al. | 345/163 |
| 6,046,722 | * 4/2000 | McKiel, Jr. | 345/145 |
| 6,067,081 | * 5/2000 | Hahlganss et al. | 345/173 |
| 6,128,671 | * 10/2000 | Weijand | 345/163 |

* cited by examiner

Primary Examiner—Steven Saras
Assistant Examiner—Paul A. Bell
(74) Attorney, Agent, or Firm—Hedman & Costigan, P.C.

(57) ABSTRACT

An electronic data display system (EDDS) which includes a system for containing a multiple data field environment (MDFE) including portions of displayable data; at least first and second displays for displaying data contained within the MDFE, capable of displaying data selected from different portions of the MDFE, wherein at least one of the displays is a tactile display; apparatus for selecting data for display by the first display, from a first portion of the MDFE; and apparatus for selecting data for display by the first display, from a second portion of the MDFE, different from the first portion.

13 Claims, 19 Drawing Sheets

Pixel→Pin    Line→Line    Letter "n"→Letter "n"

Scale 1:2

Scale 2:1

Edge extraction

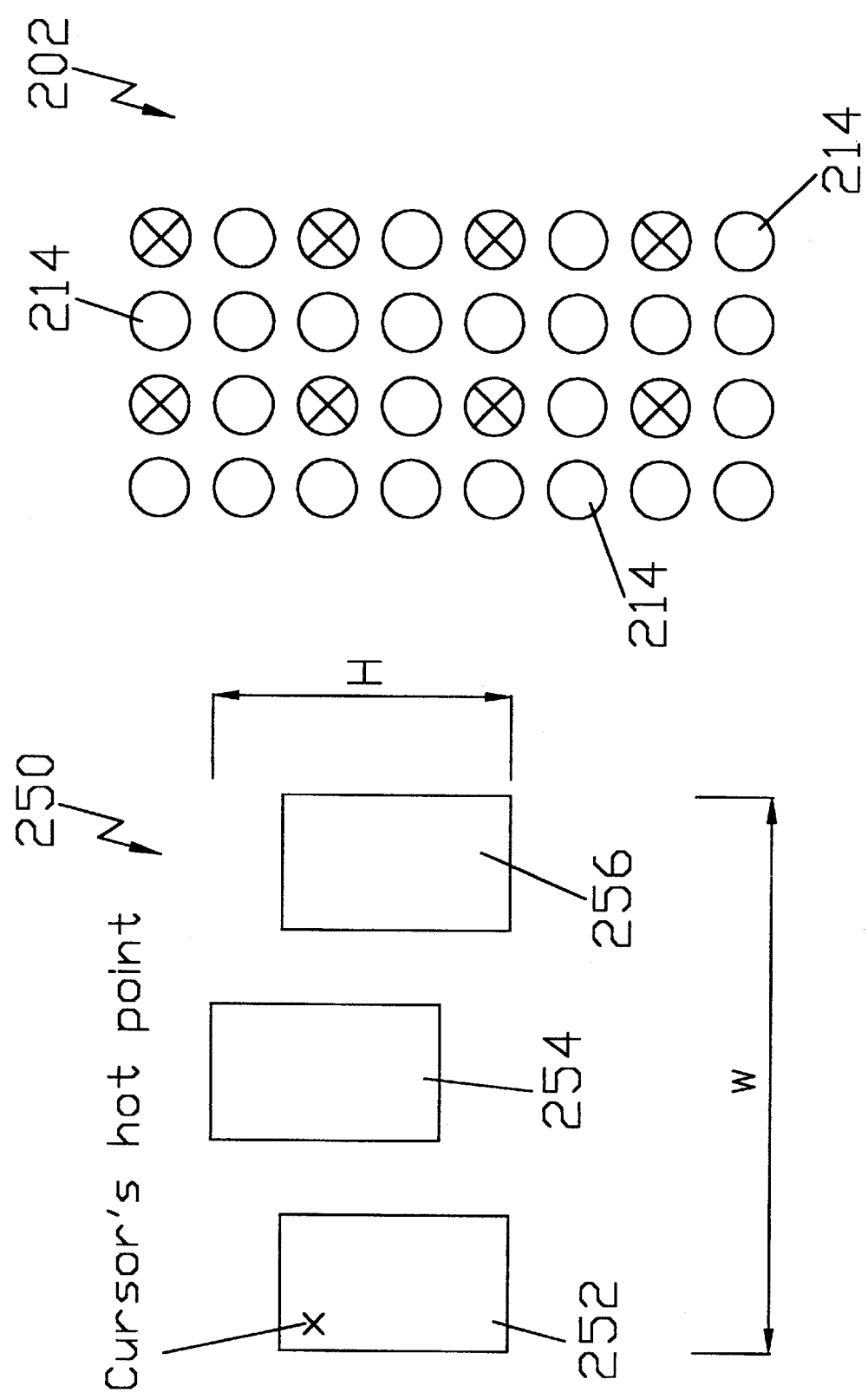

TACTILE INTERFACE SYSTEM FOR ELECTRONIC DATA DISPLAY SYSTEM

REFERENCE TO APPLICATIONS

The present application is a continuation-in-part of U.S. Ser. No. 08/781,017, filed Jan. 9, 1997, now U.S. Pat. No. 5,912,660 for "Mouse-Like Input/Output Device with Display Screen and Method for Its Use," the contents of which is incorporated herein, by reference.

FIELD OF THE INVENTION

The present invention relates to tactile interface systems for use with electronic data display systems generally, and to tactile interface systems for use with multiple environments, in particular.

DEFINITIONS

The term "electronic data display system," referred to herein also as EDDS, is used throughout the specification and claims to mean any computerized system for electronically displaying data, including computer displays, telecommunications devices such as cellular telephones, satellite telephones, palm-held devices, and the like, and interactive terminals such as automated teller machines, and the like.

The term "multiple data field environment," referred to herein also as MDFE, is used throughout the specification and claims to mean any of different selected portions of a single window in a single software application; multiple window environments, either in a single software application or in multiple software applications; multitasking environments; and multiple, interrelated layers in a single application, in which, for example, one layer may be a 'top level', software generated document, while another layer is source data relating to the document, wherein all such MDFEs are resident in an EDDS.

The term "tactile display," referred to herein also as TD, is used throughout the specification and claims to mean any sort of tactile display based on heat or humidity, as well as an embossed type tactile display having a plurality of pins which are selectably retractable with respect to a surface, such as that described in applicant's co-pending application, U.S. Ser. No. 08/781,017, filed Jan. 9, 1997, for Mouse-Like Input/Output Device with Display Screen and Method for Its Use. In an example which requires specifically an embossed type tactile display, the acronym ETD is used.

BACKGROUND OF THE INVENTION

In the prior art, a user interfaces with MDFEs by use of a visual display; a mouse and a keyboard, which function as navigation and data selection/input devices. While systems for enabling visually impaired people to interface with computer displays are known in the art, such as U.S. Pat. No. 5,736,978 to Hasser et al., entitled "Tactile Graphics Display," none exists for enabling visually impaired users to interface with MDFEs.

SUMMARY OF THE INVENTION

The present invention seeks to provide a tactile interface system (TIS) for use with multiple environments (MDFEs), wherein the TIS has a plurality of tactile displays which may be used to replace or supplement visual perception, and to supplement other data interfaces, including audio and motor, thereby increasing the data input/output options available to the user.

The TIS of the present invention is thus intended to maximize access to and interaction with any EDDS, by visually impaired users, including blind-deaf-mute users. The system is also intended for use by sighted users, so as to provide them, where relevant, with a further dimension of interaction with an EDDS, namely, tactile, which is often perceived in the art as being the reserve of the sight-impaired, only.

There is thus provided, in accordance with a preferred embodiment of the present invention, an electronic data display system (EDDS) which includes a system for containing a multiple data field environment (MDFE) including portions of displayable data; at least first and second displays for displaying data contained within the MDFE, capable of displaying data selected from different portions of the MDFE, wherein at least one of the displays is a tactile display; apparatus for selecting data for display by the first display, from a first portion of the MDFE; and apparatus for selecting data for display by the second display, from a second portion of the MDFE, different from the first portion.

Preferably, two or more of the at least first and second displays are tactile displays.

In accordance with an alternative embodiment of the invention, there is provided a system for containing a multiple data field environment (MDFE) including portions of displayable data; and first and second movable navigation devices, wherein the first movable navigation device includes one or more tactile displays for displaying data contained within the MDFE, and apparatus for selecting data for display by the one or more tactile displays from a first selected portion of the MDFE; and the second movable navigation device is provided for use simultaneously with the first navigation device, and includes one or more tactile displays for displaying data contained within the MDFE; and apparatus for selecting data for display by the one or more tactile displays from a second selected portion of the MDFE, different from the first selected portion.

BRIEF DESCRIPTION OF THE DRAWINGS

The present invention will be more fully understood and appreciated from the following detailed description, taken in conjunction with the drawings, in which:

FIG. 11 is a schematic illustration of a graphic cursor as may be used in conjunction with the system of the invention;

FIG. 12 shows a pin array used for the display of Braille characters;

DETAILED DESCRIPTION OF THE INVENTION

Figure 1:
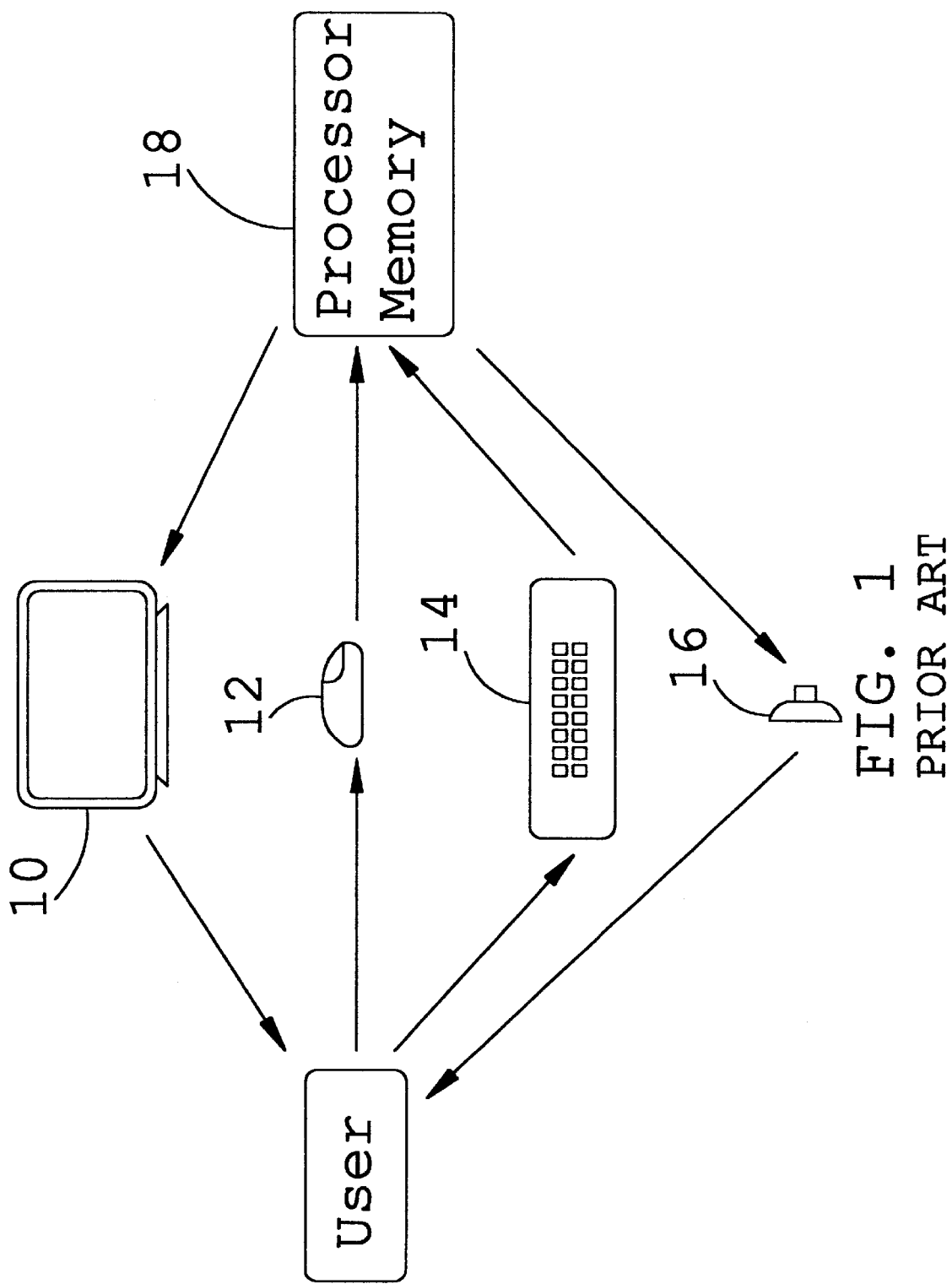
FIG. 1 is a diagrammatic representation of an EDDS of the PRIOR ART.

Referring now initially to FIG. 1, there is shown a PRIOR ART system, in which interaction between an EDDS, such as a computer, and a user, is facilitated primarily through a visual display unit (VDU), reference 10, a navigation and data selection/input device or mouse, reference 12, a keyboard referenced 14, and usually also a multimedia system, shown by a speaker, reference 16.

The illustrated PRIOR ART system provides the user with access to the computer memory 18 and data processing capabilities, within the mouse 12 and/or keyboard 14 facilitates user access to required information, and further facilitates data entry by the user. VDU 10 and multimedia system 16 allow the user to view and hear visual and audio data. As known, this system relies heavily on visual interaction between the user and the EDDS, and is thus unsuited for the visually impaired, rendering the EDDS virtually inaccessible thereto.

For many visually impaired users, and especially for the totally blind, the only manner in which data may be exchanged with an EDDS is via a tactile display, referred to herein also as TD, such as that described in applicant's co-pending application, U.S. Ser. No. 08/781,017, entitled "Mouse-Like Input/Output Device with Display Screen and Method for Its Use."

The TIS (tactile interface system) of the present invention provides a sighted user with an additional interaction sense, which, hitherto, is not known in standard personal computer systems, but more crucially, provides a visually impaired user with a main interaction sense without which, as mentioned above, exchange of data with an EDDS is virtually impossible. The present invention is based on unique features which characterize the sense of touch, which include the following:

It is distributed among different parts of human body. This allows use almost every part of user's body as a destination for tactile sensation, thereby enabling the possible use of different portions and/or different types of tactile output signals to be used for different purposes.

The sense of touch is one possessed by substantially every human being, regardless of age, health conditions, existing disabilities—for blind-deaf-mute people this is the only way for communication and accessing information.

Tactile sensation is strictly dynamic in nature. The human body perceives tactile sensation almost immediately, and further, the tactile sensation resulting from a static touch disappears very rapidly.

For better tactile observation of an object, a tactile sensation must often be accompanied by a relative lateral motion between a sensing body portion, such as a finger, and an object being touched thereby.

The present invention exploits these unique characteristics of tactile sensation to display various types of data from an EDDS, optionally emanating from various data environments, via a plurality of tactile displays (TDs). The system further, includes one or more navigation devices (NDs) in conjunction with the TDs. Selection of various parameters and other input of data is provided via one or more switch devices (SDs) associated with the EDDS.

The TDs shown and described herein are substantially as shown and described in the Applicant's co-pending application, U.S. Ser. No. 08/781,017, and are operative to transform information received from a computer into a form that can be perceived by touch. The user can touch a TD with any of a number of body portions, including fingertips, wrists, palms, elbows, back, and so on, in order to perceive information, thereby to provide an informational basis for interaction with an appropriate EDDS.

While several additional ways exist to generate information for tactile perception, including heat and humidity, the preferred manner in the present invention is by way of an embossed tactile display, typically with retractable pins, which may or may not be covered with a thin, elastic film. Other means, however, are also intended to be included herein, and may be employed, in certain applications, either together with or independently of an embossed tactile display.

The provision of a plurality of TDs facilitates the display thereby of data which may be of a type which is the same for one or more of the TDs, or of different types, such as found in an MDFE.

By way of example, only, uniform information, which simply means that different portions of a single display are displayed via the various TDs in a system, could be any of the types included in the following, non-exhaustive list:

various types of graphics, including drawings, diagrams, maps, circuit diagrams, and so on;

text, presented with Braille code or printed symbols;

animations, including software games, animated GIFs, and applets; and warning signals and the like.

Figure 2:
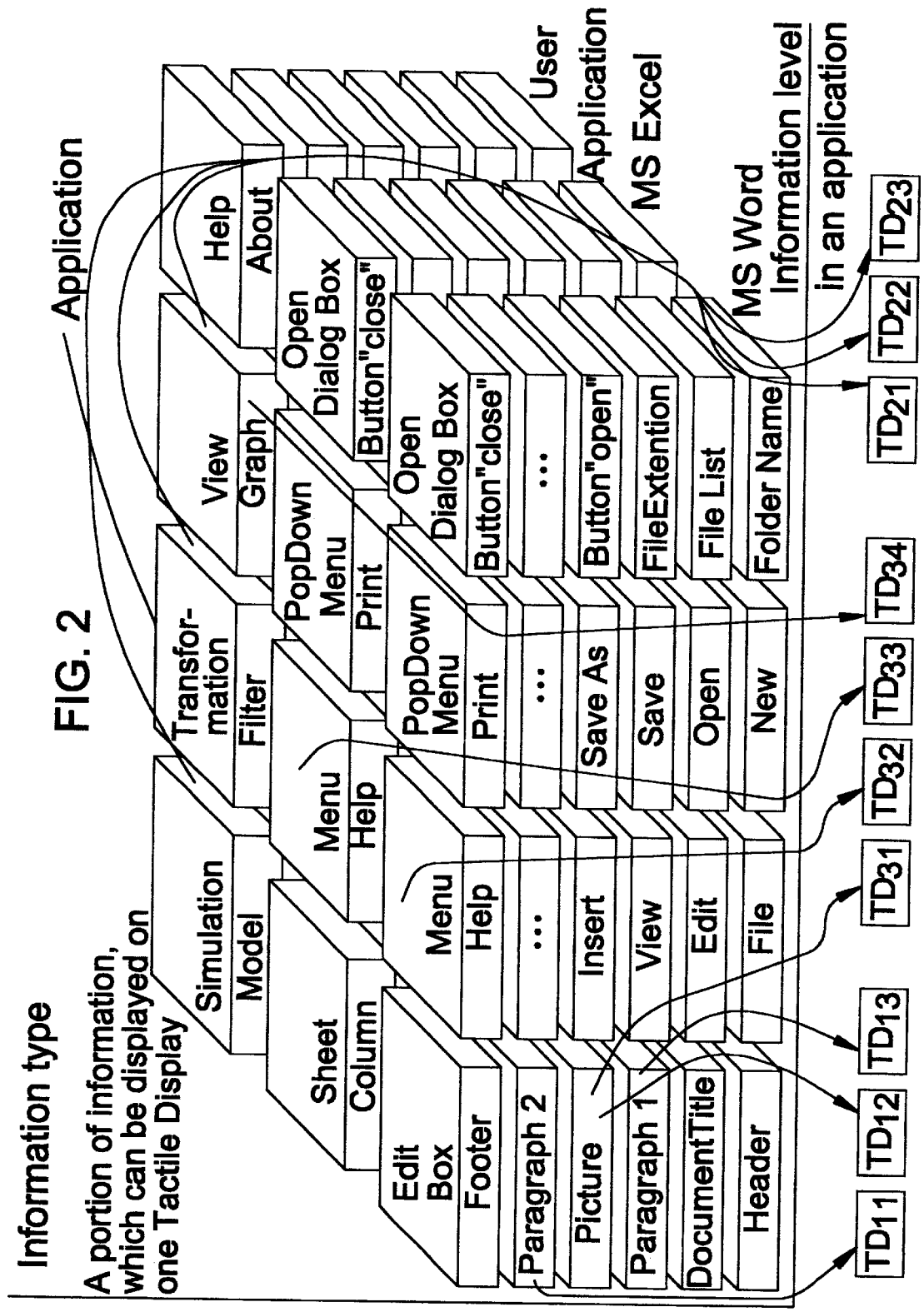
FIG. 2 is a diagrammatic representation of a typical MDFE accessible by the TIS of the present invention.

Referring now to FIG. 2, there is illustrated an exemplary MDFE which is resident in a computerized EDDS, which is accessible by the TIS of the present invention. For convenience, three groups of TDs are illustrated. Typically, three or four TDs are integrated with a single ND so as to constitute a TIS, and the different TDs thereof may be used to access various levels of types of data in an MDFE. Accordingly, the three groups of TDs depicted in FIG. 2 typically represent a single TIS having three or four TDs in use, accessing different portions of the MDFE.

As seen in the drawings, the TIS may be used to interact with the illustrated EDDS in any of the following situations:

1. Display Of Different Portions Of Information In A Single Application

Of the illustrated TDs, three, referenced $TD_{11}$, $TD_{12}$, and $TD_{13}$, are depicted as displaying information from the 'Edit' box of a word processing program, such as Microsoft® Word®.

Of these three TDs, $TD_{11}$ and $TD_{13}$ are displaying text from paragraphs, namely, 'paragraph 1' and 'paragraph 2,' in either the same of different documents, or even different portions of a single paragraph. $TD_{12}$ is used for displaying graphic information 'picture,' which is contained in the same Edit box.

2. Display of Different Types Of Information In Different Levels Of An Application Of the TDs illustrated, $TD_{21}$ is exemplified as displaying graphic or text description of a mathematical model for simulation of a production process, for implementation with a special application. $TD_{22}$ is seen to be displaying a graphic or text description of a filter applied for current simulating process, and $TD_{23}$ is seen to be displaying a graphic presentation of results generated during or at the end of a simulating process.

3. Display of Information in Different Applications

This is a very flexible mode, which allows the user to manipulate different applications, at any selected level.

By way of example, $TD_{31}$ presents all or part of a graphic image 'picture' from a Microsoft® Word® document; $TD_{32}$ shows a selected menu from Microsoft® Word®; $TD_{33}$ displays the contents of a selected menu from Microsoft® Excel®, and $TD_{34}$ displays graphic or text description of a mathematical model for simulation in a further user application.

Figure 3:
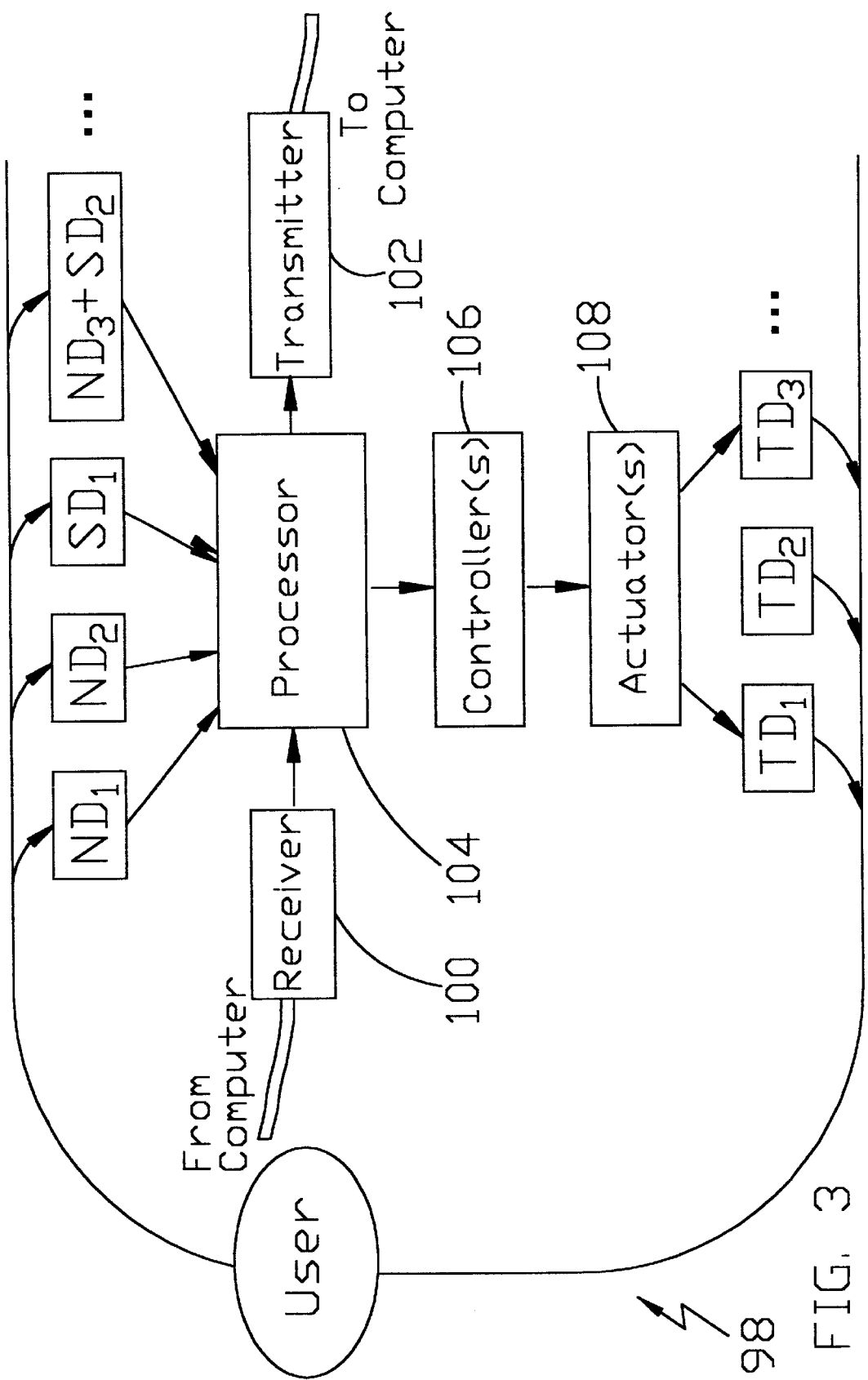
FIG. 3 is a block diagram representation of a TIS, constructed and operative in accordance with a preferred embodiment of the present invention.

Referring now to FIG. 3, it is seen that the TIS of the present invention, referenced generally 98, includes one or more NDs, with which are associated with one or more TDs, substantially as described above. Each TIS includes a receiver 100 for receiving tactile display data from an EDDS, and a transmitter 102 for transmitting navigational and selection data from the TIS to the EDDS. TIS includes a processor 104 for processing data received from EDDS via receiver 100, which is associated with a controller 106 operative to control pin actuators 108 associated with the TDs. There are further provided one or more switch devices (SDs), which may optionally be incorporated with an ND, as exemplified by ND3, and via which commands may be input to EDDS, via processor 104 and transmitter 102.

Preferably, the NDs are similar to that shown and described in Applicant's co-pending application, U.S. Ser. No. 08/781,017, entitled "Mouse-Like Input/Output Device with Display Screen and Method for Its Use." As shown in the drawing, more than one ND and/or more than one TD and SD may be provided in a single TIS, either for use by a single user, or by different users accessing the same EDDS together.

The TIS 98 of the present invention also includes software, which preferably includes two main portions, one portion which is resident in a memory (not shown) of processor 104 of TIS 98, and which includes software for various functions, including the following:

1. Interfacing between TIS and EDDS.
2. Collecting information from the NDs and SDs.
3. Preparing information package for sending to the EDDS.
4. Decoding information package received from the EDDS.
5. Preparing commands for controller(s) 106 for activation of the tactile pin arrays (not shown).

There is also provided a set of software applications, which is resident in the memory of the EDDS. These applications are operative to perform various functions, including:

1. Interfacing between the EDDS and TIS.
2. Decoding and processing data received from the TIS transmitter 102.
3. Searching for required information in the EDDS and sending it to a display driver.
4. Transforming the information for display to required form or forms, including visual, tactile, or audio.
5. Preparing the information for transmitting to receiver 100 of the TIS.
6. Providing an interface between the TIS and various standard applications, including internet browsers, word processors, and graphics programs, as well as educational programs with tactile output, tactile computer games, and games including a tactile output channel.

Figure 4:
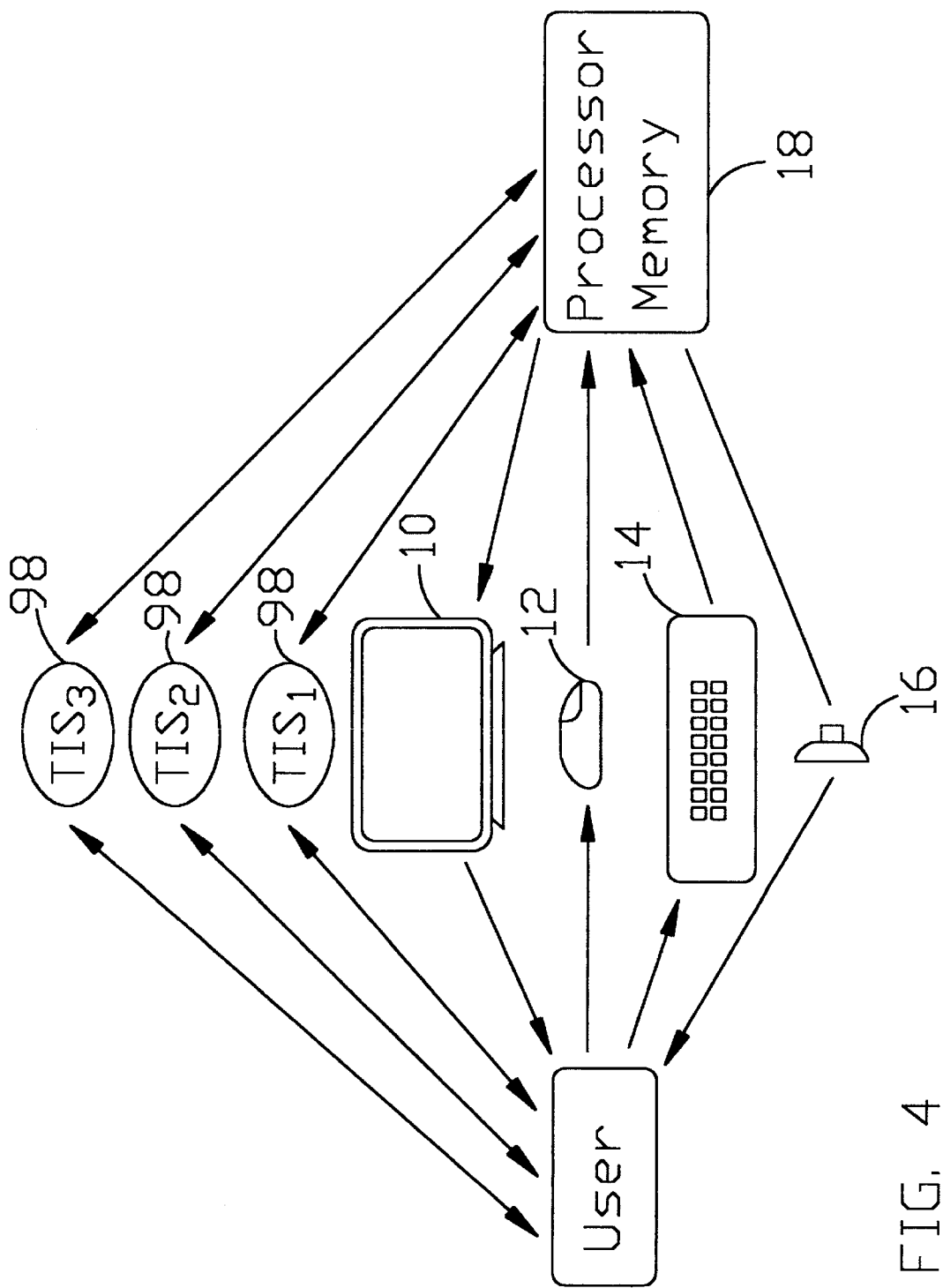
FIG. 4 is a diagrammatic representation of an EDDS incorporating one or more TISs, in accordance with the present invention.

Referring now briefly to FIG. 4, it will thus be appreciated that a user equipped with one or more TISs in accordance with the present invention, is able to access EDDS information in addition to that shown and described above in conjunction with FIG. 1, or in place thereof. As seen, the system includes the above-described PRIOR ART system or portions thereof, but with the addition of one or more TISs 98, which enable access to portions of the MDFE running in the EDDS, substantially as shown and described above in conjunction with FIG. 2.

Use of the illustrated system is similar to that of the PRIOR ART system, except that, for a visually impaired user; the one or more TISs 98, each having an ND having preferably a plurality of TDs, essentially replace the VDU 10, and potentially enable simultaneous access by the user to portions MDFE not normally available to a sighted user using a VDU only. Alternatively, for a sighted user more comfortable with the visual display received via the VDU 10, TIS 98 may provide additional levels of interfacing with the EDDS, particularly with regard to warning signals.

Furthermore, use of the TIS of the present invention also affords the possibility, typically to industrial and engineering designers and to Internet vendors, of making available for downloading textural or tactile data files, thereby to provide and additional dimension which hitherto has not been generally possible.

Operation of the system of the invention is now described, in conjunction with FIGS. 3 and 4.

The one or more TISs receive information from the EDDS, which is displayed by the TDs (FIG. 3), after which the user moves an appropriate ND (FIG. 3) in either a two- or three-dimensional space so as to await or search for a next desired segment of available information. An appropriate SD (FIG. 3) is also employed, as desired, so as to enter appropriate commands or messages.

As described in applicant's co-pending application, U.S. Ser. No. 08/781,017, absolute or relative coordinates of the one or more NDs (FIG. 3) are sent to processor 104 of TIS 98, which combines this data with signals entered by the user via the one or more SDs (FIG. 3) so as to construct a message according to a predetermined protocol. The message is then transmitted via transmitter 102 (FIG. 3) to the EDDS.

The EDDS is then operative to process the data contained in the message and sends any requested or additional data to the TDs (FIG. 3) for display thereby. This data may also optionally be displayed on VDU 10.

The TDs were described above as being formed into an integrated device with the NDs. However, in accordance with one embodiment of the invention, this is not necessarily so, and, while one TD, such as may be used for display of graphics may be mounted onto an ND, together with an SD, so as to take on the general configuration shown and described in Applicant's co-pending application U.S. Ser. No. 08/781,017, a second TD, which is stationary, and which serve as a display for the user's other hand, and which may optionally have associated therewith a further SD, may be provided specifically for the display of text characters, such as letters and numbers. Clearly, these letters change in accordance with position and orientation of the ND, or in response to selection of predetermined commands via an SD.

A third TD may be configured for placement on an arm or finger, for example, and may serve merely for warnings, indicated by momentary or periodic extension of one or more pins.

A fourth TD may be configured for attached in tactile association with the user's back, and may have a grid—which may be rectangular or any other preferred shape—of moving pins, having a spacing of 20–30 mm. This TD is particularly useful as part of a three dimensional area or image which may extend to the rear of the user, wherein movement of the pins indicates movement of a target portion behind him, and wherein the each segment of the image behind the user is defined by the position and orientation of the ND containing the first TD.

Figure 5A:
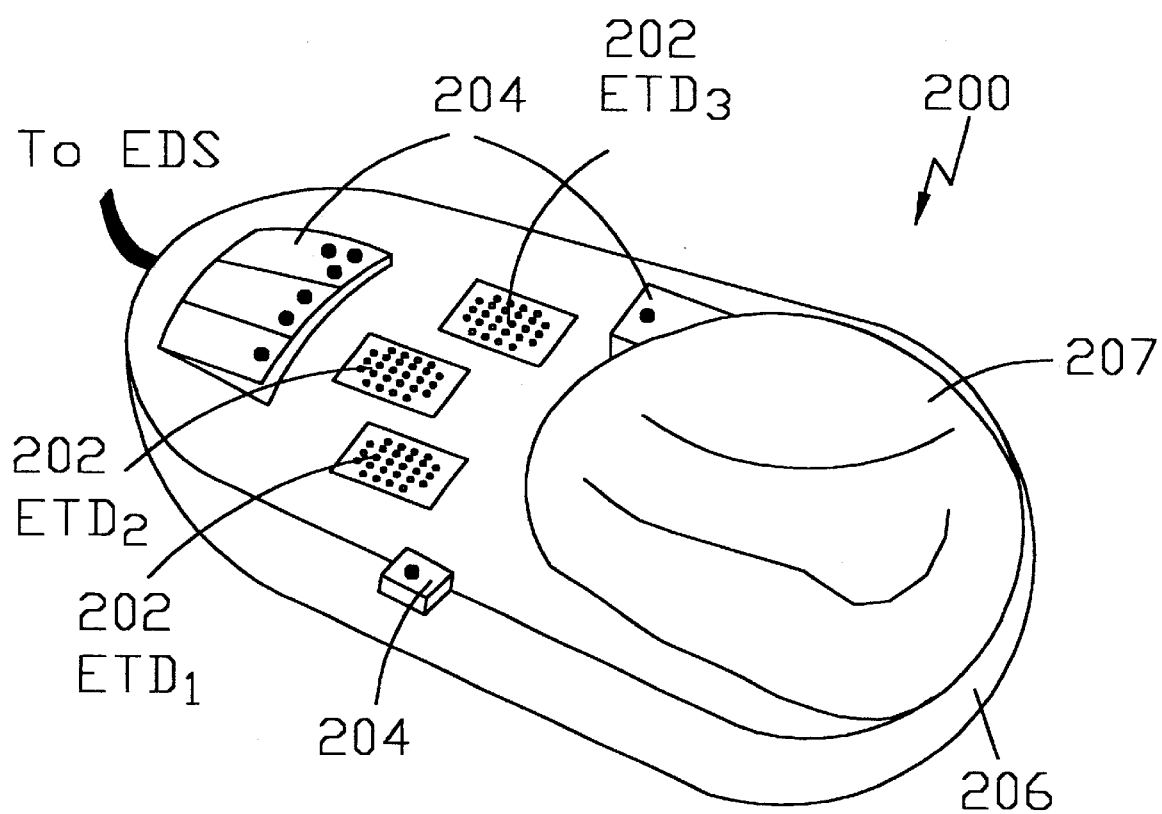
FIGS. 5A and 5B are top and side views of a fully integrated tactile interface system (FITIS) constructed in accordance with a further embodiment of the present invention.
Figure 5B:
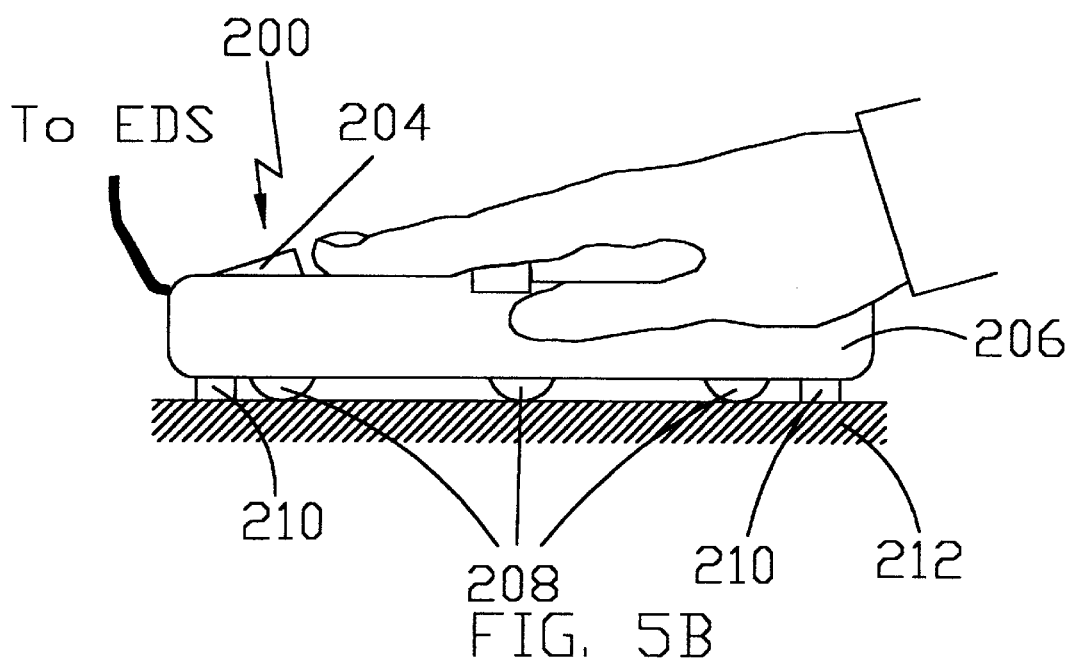

Referring now generally to FIGS. 5A–5B, there is now described a fully integrated TIS—and use thereof—which incorporates all the functions described hitherto in a single device, and which is intended, together with appropriate software, for a sighted user, to supplement the conventional mouse and VDU traditionally used with an EDDS such as a computer, and, for a visually impaired user, to fully replace the conventional mouse and VDU. Essentially, the only reason for which a visually impaired user may require a conventional mouse and VDU would be so as to enable a sighted user, not possessing the tactile acuity of the visually impaired user, to use the same EDDS.

While not detracting from the generality of the EDDS as defined above, the following description relates to a case in which the EDDS is any type of MDFE computer. Furthermore, the terms of reference used in the following description include the use of a VDU, primarily so as to facilitate comprehension of the present invention as described below.

In summary, the following description of the Fully Integrated TIS, referred to hereinbelow as FITIS, relates to use thereof by a visually impaired user, who thus does not have the benefit of interaction between a normal mouse and VDU, and wherein the FITIS is thus the sole channel for information which for a sighted user would be shared between the mouse and VDU.

Referring now specifically to FIGS. 5A and 5B, the FITIS, referenced generally 200, includes typically between two and five ETDs 202, a plurality of buttons 204 functioning as SDs for sending commands to the EDDS, and an ND. ETDs 202 and SDs 204 are supported in association with a housing 206 which is formed ergonomically, having a palm rest 207 and generally arranged so that all the ETDs 202 and SDs 204 are positioned so as to be comfortably and usefully contacted by the user's fingers. While the ETDs 202 may have fixed positions on the housing, they may alternatively be mechanically adjustable, by any suitable means such as adjustment screws, such that their relative positions, as exemplified below in FIG. 7, may be changed so as to obtain a most comfortable fit to a user's hand.

FITIS 200 also includes, within housing, one or more track balls 208 protruding from the underside thereof, seen in FIG. 5B, which provide two-dimensional navigation substantially as described in applicant's co-pending application, U.S. Ser. No. 08/781,017, and which are thus not described again herein, in detail. A plurality of feet 210 (FIG. 5B) may also be provided for supporting the housing 206 above a travel surface 212, such that track balls 208 are frictionally engaged thereby, but do not mechanically support FITIS 200 thereon.

In use, FITIS 200 is moved along a flat surface in the same way as a sighted person moves a mouse, so as to generate current position and orientation data which is sent to the EDDS, together with commands entered via SDs 204. The position of the FITIS 200 is determined by coordinates of a selected pin on one of the TDs, known also as a "fiducial point," and its angle of rotation relative to a predetermined, typically horizontal axis. The fiducial point is denoted "X" in FIG. 7, and its function is substantially as described in U.S. Ser. No. 08/781,017.

In response to the navigational data provided by the FITIS 200, various signals are generated in the EDDS, which are sent to the processor 104 (FIG. 3) of the FITIS 200, for selective actuation of pins of specific ETDs 202, via controller 106 and actuators 108 (FIG. 3). Each signal contains information about the displacement height for each pin, substantially as described in U.S. Ser. No. 08/781,017. On touching the TDs 202, the user is able to:

Receive, absorb and analyze the data thus transmitted to him, make a decision as to how to proceed, based on the data received, and thereafter operate the FITIS 200, as desired, either by moving it to a new position and/or by pressing one of buttons 204 so as to enter a desired command.

In this manner, the visually impaired user is able to observe information from the EDDS by small portions of the data normally displayed visually and to reconstruct it in his brain, in a manner similar to that by which he would "see" by touch, any real object in his environment.

Figure 6B:
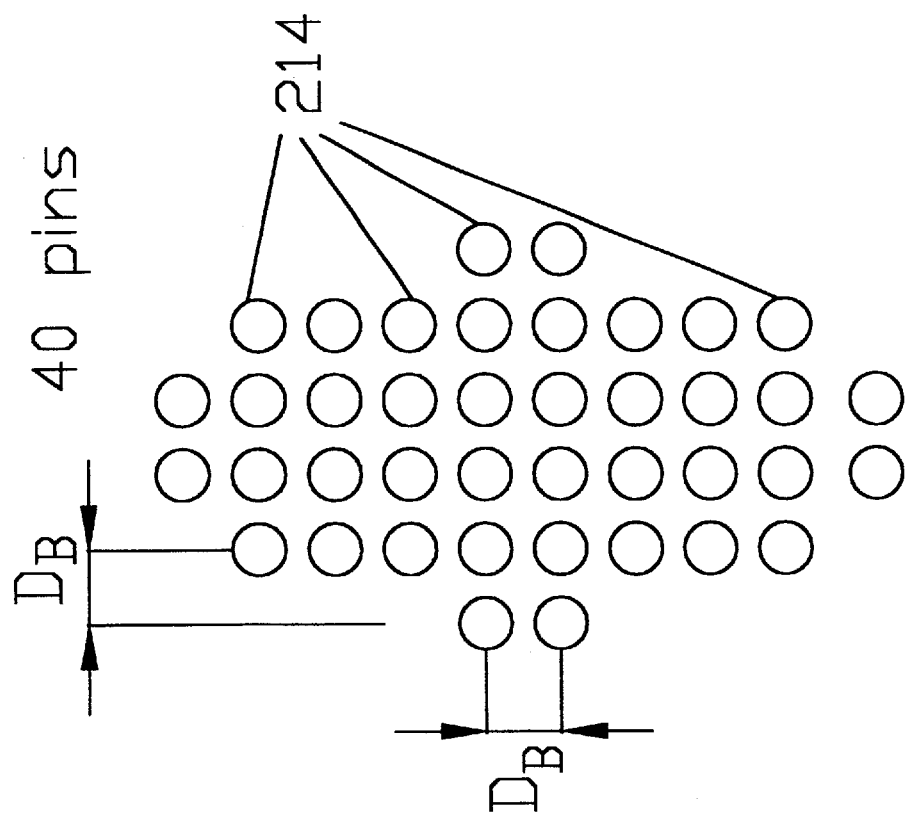
FIGS. 6A and 6B are schematic representations of the pin arrangements in variously configured embossed tactile displays (ETDs) which may be used in the FITIS of FIGS. 5A and 5B.
Figure 6A:
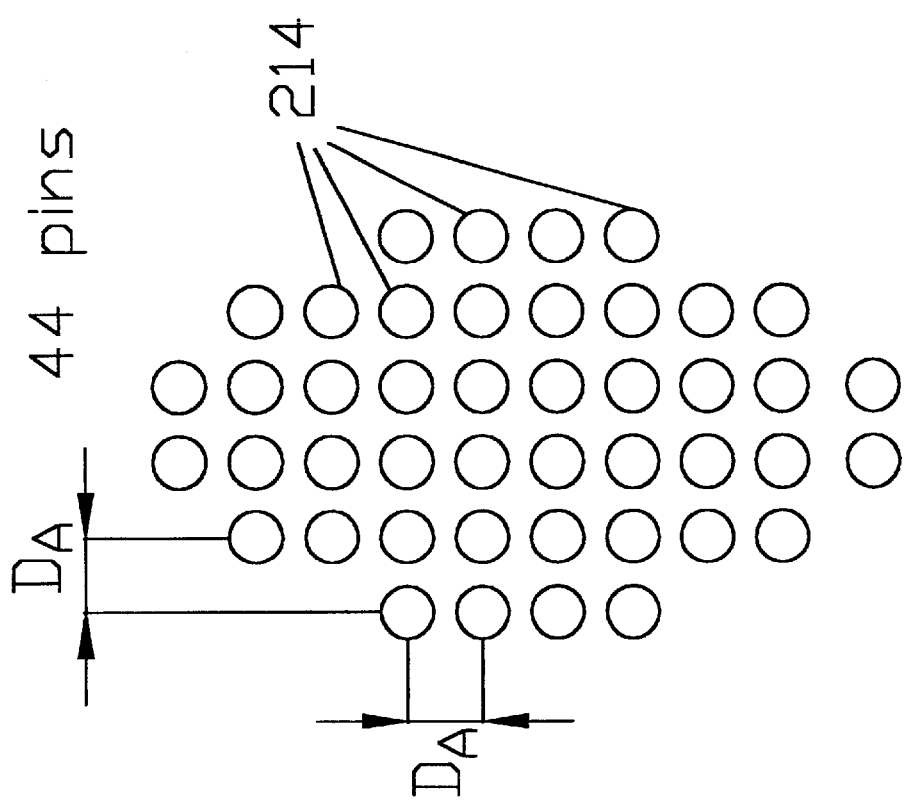

Referring now briefly to FIGS. 6A and 6B, there are shown two of various possible alternative pin arrangements of an ETD 202. In FIG. 6A, ETD 202' is seen to have an arrangement of 44 pins 214, which may be suitable for a relatively large fingertip, such as of an adult male. In FIG. 6B, ETD 202" is seen to have a smaller arrangement, of only 40 pins 214, which may be more suited for a smaller fingertip, such as that of an adult female or child. Clearly, different sized arrangements may also be formed, as required, for very small children, for example.

It is particularly preferred that the pin arrangement forms a generally oval shape, thereby to generally match the shape of the portion of the fingertip in contact with a flat surface, when pressed thereagainst.

The distance 'D' between adjacent pins 214 is depends on the resolution required in accordance, e.g. with graphic recognition, and the overall size of the ETD. Accordingly, for the larger ETD 202' seen in FIG. 6A, the distance $D_A$ between pins 214 is preferably 1.5–1.6 mm; while, for the smaller ETD 202" seen in FIG. 6B, the distance $D_B$ between pins 214 is preferably 1.1–1.2 mm. Both of these spacings provide a resolution which enables tactile recognition of graphic data, and certainly enable the reading of text in Braille. In view of the large number of pins provided, not all of which may necessarily be used for the display of text, additional information may be displayed in parallel to the display of text, as described hereinbelow in conjunction with FIGS. 15A and 15B.

Figure 7:
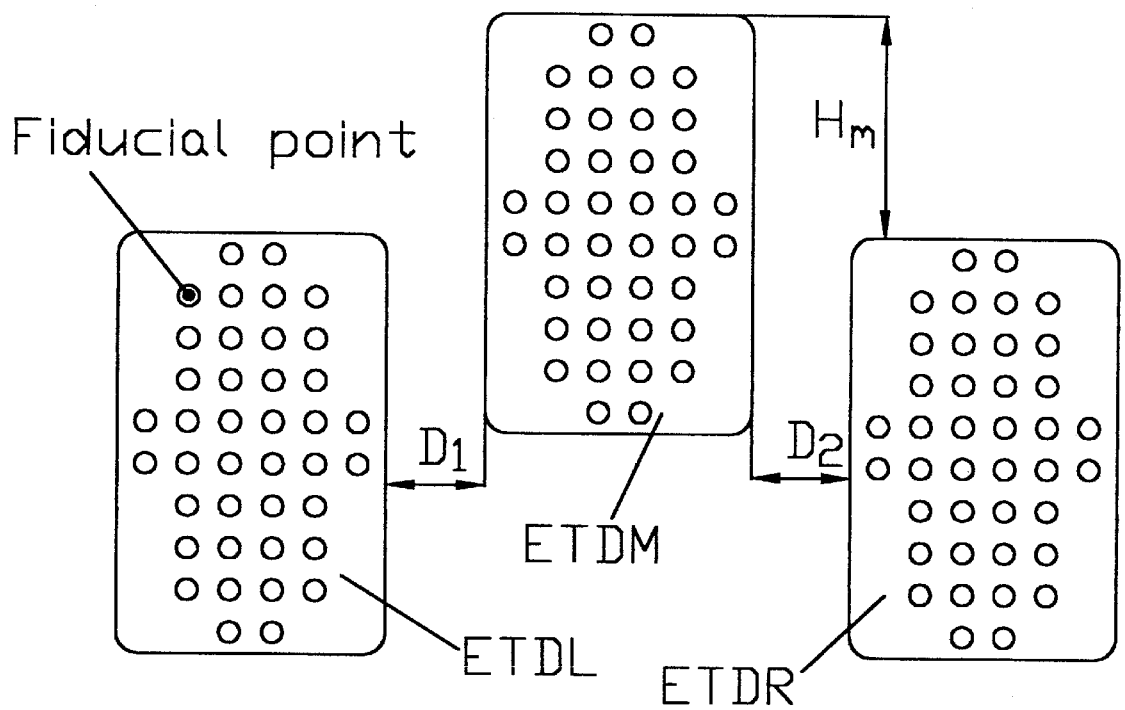
FIG. 7 is an enlarged plan view of an array ETDs of the FITIS of FIGS. 5A and 5B.

Referring now to FIG. 7, there is seen a typical arrangement of three ETDs 202, mounted onto housing 206 of FITIS 200, as shown in FIGS. 5A and 5B. The ETDs 202 are shown to be the smaller type, having 40 pins each, but this is by way of example only. As seen, the arrangement of the three ETDs 202, also identified in the drawing as left (ETDL), middle (ETDM) and right (ETDR), is so as to generally match the relative positions of the user's fingertips when his hand is generally laid flat on the housing 206 (FIGS. 5A and 5B). As seen, the ETDM, to be engaged typically by the longest, middle, finger, is located further away from the palm rest 207 than the other two ETDs, by a distance Hm.

As described above, the ETDs 202 may be movable, such that the spacings therebetween, indicated by dimensions $H_m$, $D_1$ and $D_2$, may be adjusted.

Prior to use, one of the pins 214 is selected by the user as the fiducial point of the FITIS 200, indicated by X in FIG. 7. This is described hereinbelow in conjunction with FIG. 9. When the user moves the FITIS 200 along the travel surface 212, the fiducial point is moved with the device.

Figure 8:
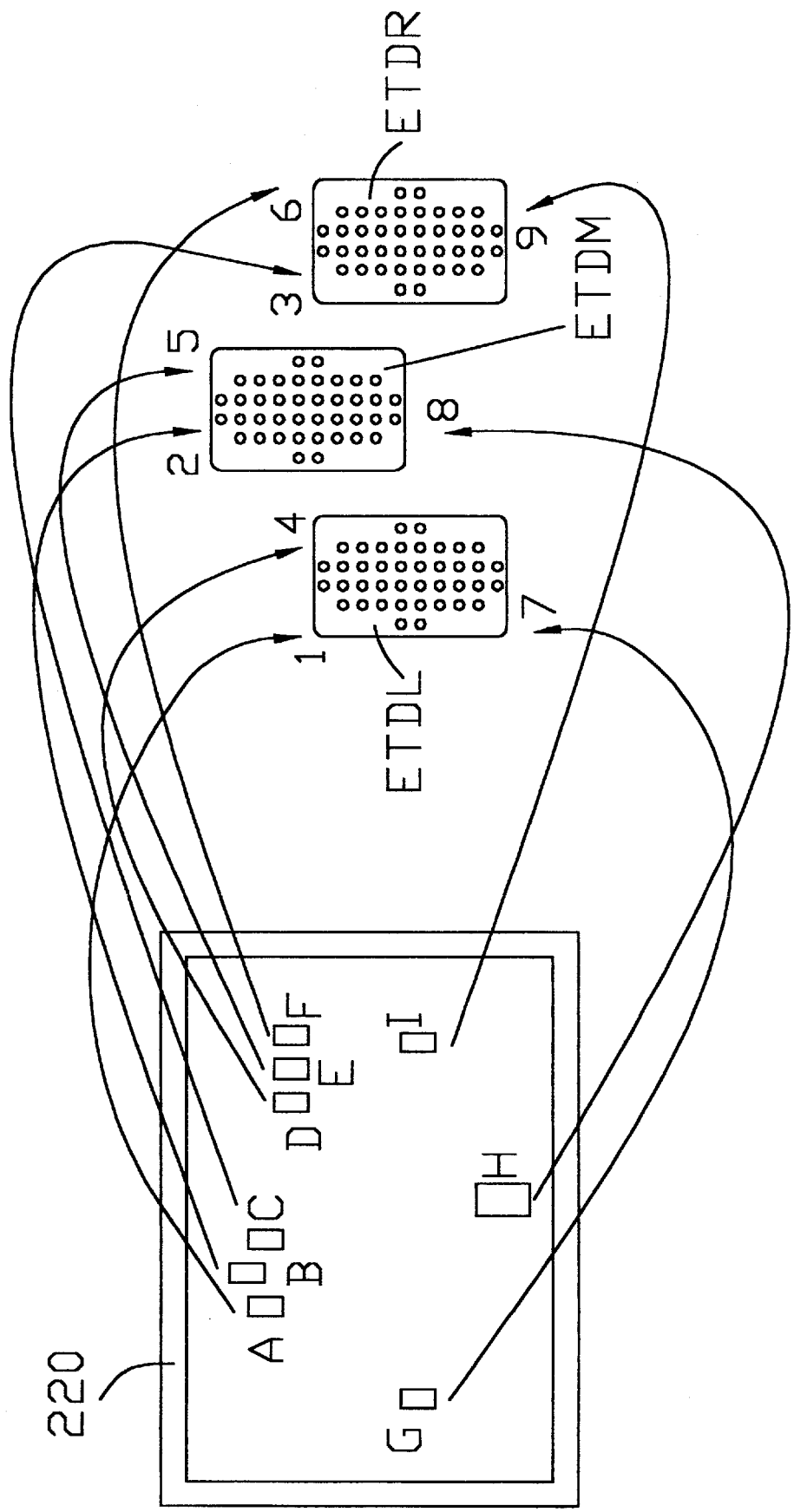
FIG. 8 is a diagrammatic illustration of the Information Distribution Principle (IDP) of the present invention.

Referring now to FIG. 8, the principle of information distribution (IDP) in a GRAPHIC MODE of operation, between three ETDs is now described. Essentially, this entails various options by which the three or more ETDs of a single FITIS can be used to display information which is displayed visually in any of the following ways:

1. in exact correspondence to the actual relative positions of the ETDs;
2. in a selected arrangement which does not correspond to the relative positions of the ETDs; and
3. positions which do not correspond to the relative positions of the ETDs, and which are different dimensions (pixel areas), thereby being displayed at different resolutions on the different ETDs.

These three cases are illustrated in FIG. 8, wherein, in the GRAPHIC MODE, the respective correspondences between portions A, B and C of a source image displayed on a VDU 220 and the destination ETDs displaying those portions are shown with arrows. Each ETD is identified with three digits, so as to facilitate—together with arrows having letter-number identification codes—the portion of the visual display being displayed by each ETD.

In the first example, arrows A1, B2, C3 indicate geometric positioning of sources rectangles A, B, C on the computer display in full correspondence to the geometric positioning of the ETDs on FITIS 200. A left portion A of the source image is sent to ETDL, a middle portion B is sent to ETDM, and a right portion C of the source image is sent to ETDR.

In the second example, in which correspondence is indicated by arrows D4, E5 and F6, there is illustrated a placement of source rectangles D, E and F, which may be more convenient for a blind user, may like to touch things when his middle finger is slightly bent so as to enable him to mutually juxtapose his fingertips.

In the third example, in which correspondence is indicated by arrows G7, H8 and I9, both the placement and scale dimensions are select by the user, so as to enable the user to observe data in different positions of the VDU. Clearly, this is also equally applicable to the portions of the MDFE, as discussed above in conjunction with FIG. 2. Furthermore, one or more source images may be generated from information which is not displayed on the VDU. For example, the image for displaying on ETDL can be taken from front side of a three-dimensional object, and for displaying on ETDM—from back side of the same object.

In operation a user may select the respective positions of the source rectangles—corresponding to the three ETDs—both before and during a working session.

Typically, the user will press a preprogrammed function key on the computer keyboard (not shown). Subsequently, the user will perform the following actions:

1. Presses a key (e.g. key F2) on the computer keyboard switching the FITIS to a settings selection mode, whereupon a voice indication is emitted from the EDDS, typically a computer, informing the user of the various available selections as he scrolls though the menu. Alternatively, this may be received as tactile output on one of the ETDs.

2. Using either the arrow keys on the keyboard, or one or more of the SDs 204 of the FITIS 200 (FIGS. 5A and 5B), the user selects 'adjustment of horizontal spacing,' between the source rectangles corresponding to ETDL and ETDM, increasing the spacing by depressing the "+" key, and decreasing the spacing by depressing the "−" key.

3. Thereafter, an 'adjustment of vertical spacing' may be selected, (shown as $H_m$ in FIG. 7), as well as a 'zoom' adjustment, changing the area selected and thus the resolution of the ETDs, wherein the smaller the size of the source rectangle, the greater the resolution on the ETD.

4. Steps 2 and 3 can thereafter be repeated for the same process can then be selected for shifting the vertical spacing between ETDL and ETDR, after which similar repositioning of the ETDM and ETDR can also be performed.

In the GRAPHIC MODE there exist alternative 'exact' and 'transformed' mapping between pixels as represented on the computer screen, on the one hand, and as displayed by pins 214 on each ETD.

Exact Mapping

Figure 9:
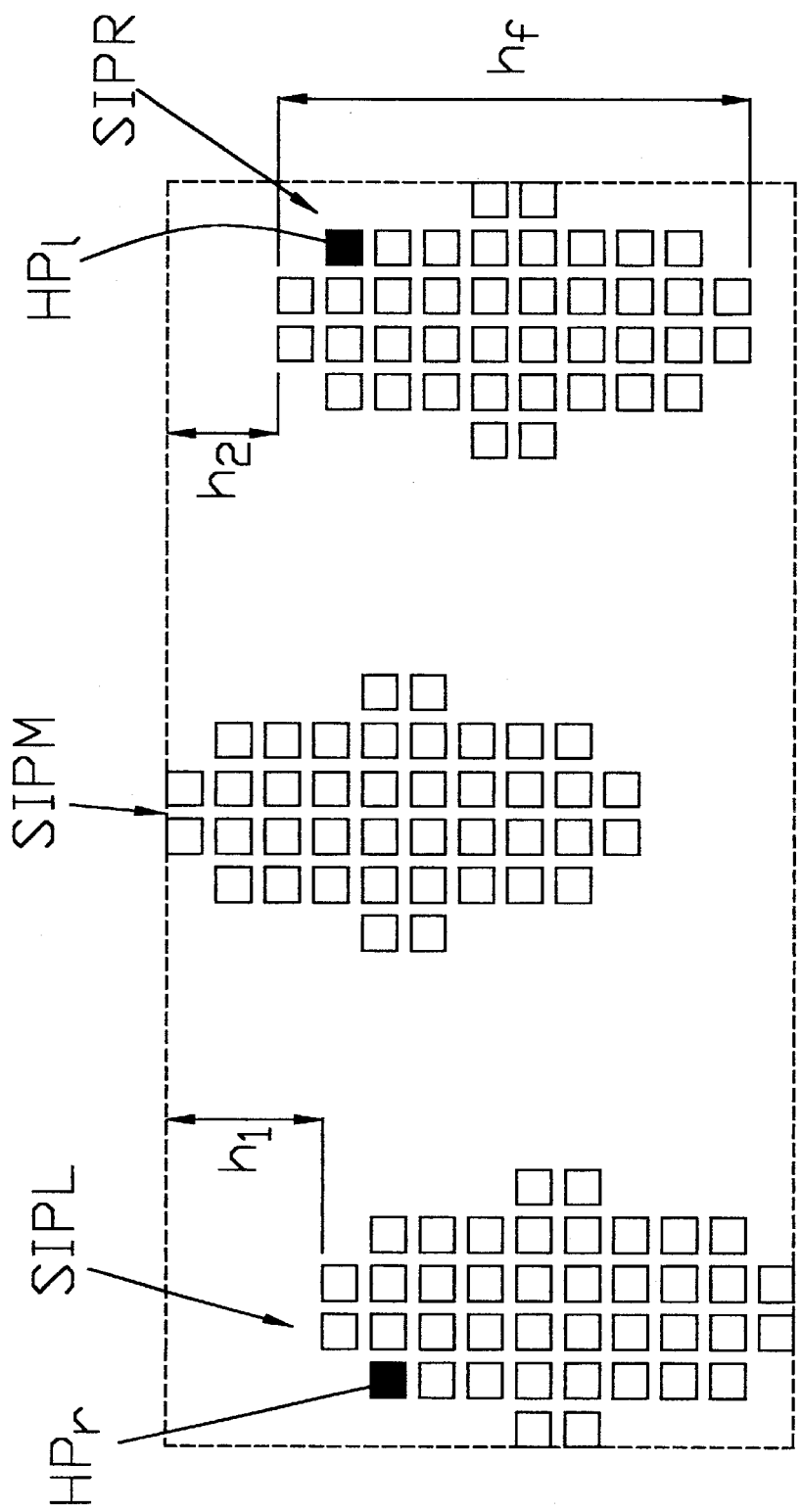
FIG. 9 is a diagrammatic illustration of mapping of the tactile displays relative to a VDU.

Referring now to FIG. 9, in the case of exact mapping, for each pin, there exists a source pixel on the computer screen. Such correspondence is defined using the fiducial point on the ETD as a reference point, whose coordinates define a so-called "hot" pixel (HP) on the computer screen. The "hot pixel" is the equivalent of the "hot point" for the cursor of regular computer mouse, which in graphic mode has both X & Y coordinates one pixel less than coordinates of North-West corner of the cursor. The user may select more comfortable placement of "hot pixel" in the way which is analogous to that described above. Two possible locations of hot pixels are shown: $HP_r$, which may be more useful for a right handed person, located in the ETD engaged by the index finger of the right hand; and $HP_l$, which may be more useful for a left handed person, located in the ETD engaged by the index finger of the left hand.

The position of the fiducial point, and thus also of the hot pixel, can be selected by the user both before and during working operations, for example, by sending special commands from keyboard. This is most likely to be used as the user becomes used to the system of the invention; if the user changes the hand he uses, if he is ambidextrous; or if a different person uses the system.

Selection of the fiducial point may be performed by the following sequence of operations:

1. The user presses a key (e.g. key F2) on the computer keyboard switching the FITIS to a settings selection mode, whereupon a voice indication is emitted from the EDDS, typically a computer, informing the user of the various available selections as he scrolls though the menu. Alternatively, this may be received as tactile output on one of the ETDs.

2. Using either the arrow keys on the keyboard, or one of the SDs 204 of FITIS 200 (FIGS. 5A and 5B), the user selects 'fiducial point setting.'

3. The user then places his fingers on the ETDs and uses the "+" and "−" keys to select the pin to be the fiducial point. Typically, each depression of the "+" key activates a command from the computer to FITIS 200 to depress the pin corresponding to the previous position of the fiducial point and to extend or raise the subsequent pin in the same column. When the last pin in the column is reached, the fiducial point "jumps" to the beginning of the next column to the right. Pressing the "−" key moves the position of fiducial point in opposite direction.

4. The fiducial point position is selected merely by stopping the selection process.

In the arrangement seen in FIG. 9, the width of the widest row in the respective source image portion (SIP), wherein there are shown left, middle and right SIPs, also shown as SIPL, SIPM and SIPR, corresponding to the respective ETDs is $w_1 = w_2 = w_3$;

the height of the longest column in the various SIPs in $H_j$;

the pixel distances between adjacent SIPs, referred to herein also as "logical spaces between fingers," are $d_1$ and $d_2$; and the vertical pixel offsets between SIPL and SIPM, and between SIPR and SIPM, referred to herein also as "logical heights relative to the middle finger," are $h_1$ and $h_2$.

In accordance with a preferred embodiment of the invention, the TIS is also capable of displaying color, wherein there is a correspondence between pixel color and the height of the pin corresponding thereto.

In conventional systems, the pixel color on the computer screen is defined in accordance with the RGB system, where r is red, g is green, and b is blue. Each of these color components varies in a range from zero to a value $M_c$ defined by type of the screen and its settings, such that r, g and b are integers in the range $0-M_c$. A combination of these values may be used to define the color of a pixel, in much the same way that these basic colors can be mixed so as to provide additional colors. By way of example, if $r=g=b=0$, then the color of the pixel may be perceived to be black. If $r=g=b=M_c$, however, then the color of the pixel may be perceived to be white, and intermediate values can be assigned other color interpretations.

In accordance with an embodiment of the invention, the pin height in the TD is defined by pixel color on the computer screen in accordance with algorithm described bellow: It will thus be appreciated that a color value, $C_p$, can be calculated for each pixel in accordance with the expression:

$$C_p = \text{integer of } (r*\delta_1 + g*\delta_2 + b*\delta_3),$$

in which $\delta_1$, $\delta_2$, $\delta_3$—predetermined constants or color weighting factors, and $\delta_1 + \delta_2 + \delta_3 = 1$.

Accordingly, $C_p$ varies in the same range, i.e. between 0 and $M_c$, wherein for black $C_p = 0$, and for white, $C_p = M_c$.

Each pin 214 is operative to represent a different color at a different height selected from N levels $L_1$, $L_2$, through $L_N$.

Figure 10A:
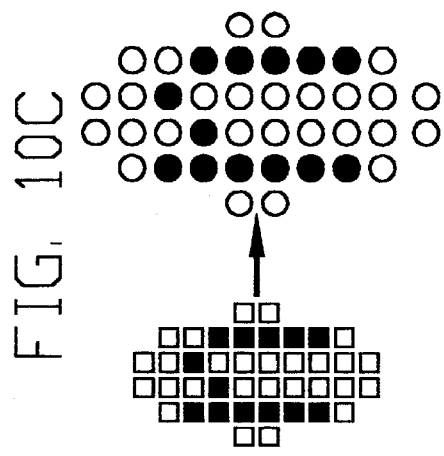
FIGS. 10A–10F show various scenarios for correspondence between a VDU and the ETDs.
Figure 10B:
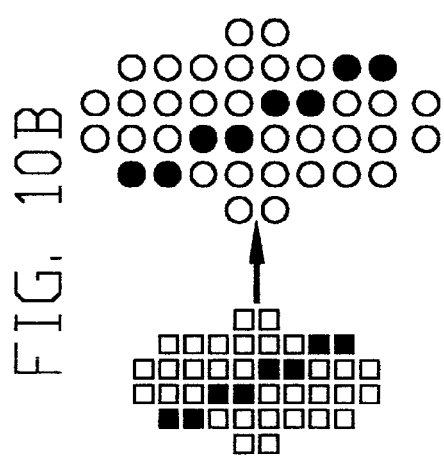
Figure 10C:
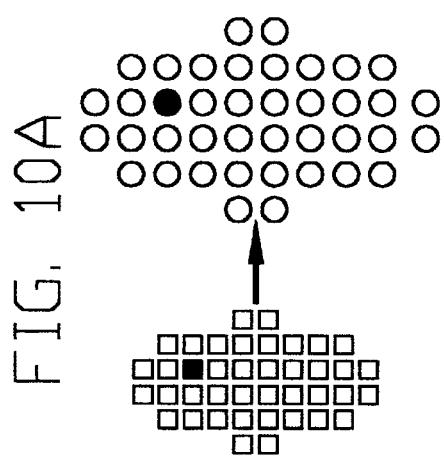

In a case wherein N=2, then each pin has only two possible positions, such that $C_p = 0$ or $M_c$, i.e. is either black, signifying pin up, or white, signifying pin down. Examples of black and white, binary images are seen in FIGS. 10A–10C. These images are essentially formed of small squares, each representing a single pixel, wherein the black squares have corresponding raised pins, depicted herein as round black shapes, and the white squares have corresponding non-raised pins, depicted herein as empty round shapes.

In a case where N>2, the range $[0, M_c]$ can be divided to N sub-ranges $[m_i, m_{i+1}]$, in which $i = 0, 2, \ldots, N$, $m_0 = 0$ and $m_N = M_c$.

If $C_p \in [m_i, m_{i+1}]$, then the corresponding pin is leveled on the $i^{th}$ height level.

A practical consideration in defining the number of available color levels in the ETDs employed herein, is the trade off between the theoretical number of levels available, and the degree of tactile contrast that is sensible by a user.

In accordance with the present invention therefore, there are preferably provided a minimum of four pin levels and, for users with particularly sensitive fingertips, this may be increased to eight different levels.

It will be appreciated by persons skilled in the art that while the above description of color display uses by way of example, the RGB system, it may also be employed for high contrast display of black and white images, such as photographs, which may have many different levels of gray.

Transformed Mapping

Figure 10D:
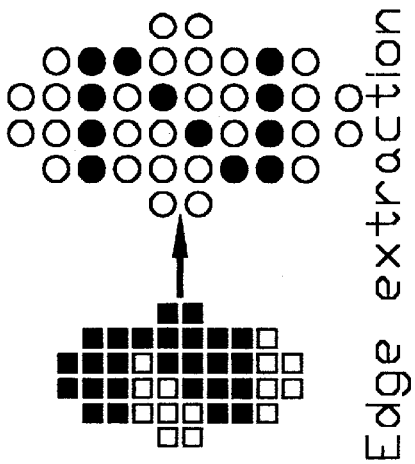
Figure 10E:
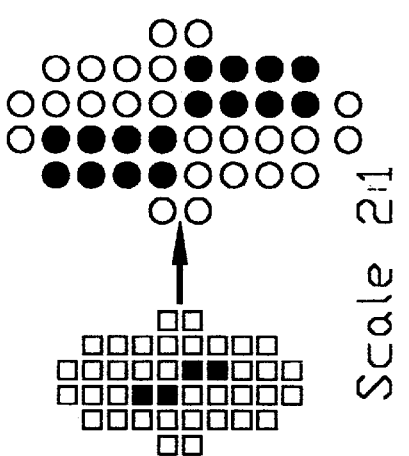

Referring now to FIGS. 10D and 10E, the present invention also provides resizing or zooming of an image, wherein the scale of the source image displayed on the VDU is unchanged, but the user may choose to display a tactile image in a different scale. This may be done, for example, after 'reading' the image on one or more ETDs at a 1:1 scale, and then deciding to either enlarge the image so as to be able to understand certain small details thereof, or, alternatively, in the event that the portion of the source image is too small a part of the entire image so that it is difficult to understand it, a user may elect to zoom out, so that he can first get an overall idea of the graphic information displayed, thereafter zooming in again to study it in detail.

Resizing is performed by changing the ratio between the number of source pixels Px, and number of destination pins Pn on the ETD. By way of example, FIG. 10D demonstrates zooming out, or resizing so as to reduce the tactile displayed image by 1:2, such that, each 2 pixel column and row of the source image is represented by a single pin, only, on the destination image displayed on the pin array of the ETD.

Conversely, in the example of FIG. 10E, each single pixel of the source image is increased by a ratio of 2:1, so as to be displayed by 2 pins in each column and row on the ETD. This is useful for examination of small details, such as text written in graphics with small fonts, icons on the desktop and toolbars, and so on.

It will also be appreciated that the aspect ratio may be adjusted, such that the column and row proportions are changed relative to each other, as known in many conventional graphics programs.

The height of the various pins used for displaying the image pin are preferably determined in accordance with the colors of the source pixels by use of different methods well known in the art, including, averaging, dilation, erosion, and the like.

Resizing and color display are required to be available for the blind to facilitate easy image recognition, and orientation within the image. They must be available as real time options, such that pressing a key on the computer keyboard or a switch device button on the FITIS 200 activates a predetermined software subroutine for image transformation, as described.

Figure 10F:
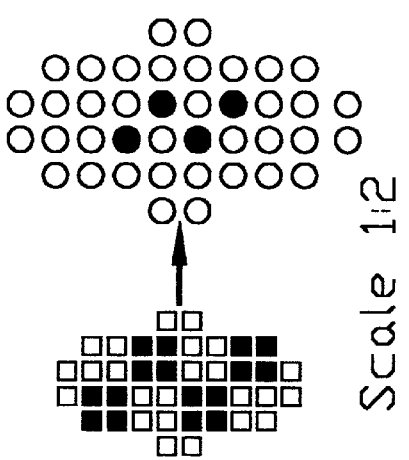

FIG. 10F shows an example of a procedure which is well known in image processing, namely, edge extraction. It can be especially useful for image transformation for the blind.

Use of the TIS of the present invention is intended to facilitate not only use of an EDDS, such as a computer, by a sole, visually impaired person, but it may also be used so as to enable working together by a visually impaired and a sighted person, together. Typically, this will be a work or study environment, when one person wishes to demonstrate an idea or suggestion by means of a computer, although it may also include computer games requiring two people, for example.

Clearly, this requires the provision of a specific cursor, whose purpose is generally similar that of the mouse cursor, and which is visible for a sighted partner but is not detected by the blind user. When used for text, this cursor preferably changes shape, typically becoming a horizontal line, underscoring a number of letters being sent to the FITIS, and which is moved synchronously with the motion thereof.

Referring now to FIG. 11, when used for graphics, the cursor may be of any suitable type, in accordance with one embodiment of the invention, there is provided a graphics cursor, referenced generally 250, and illustrated in magnified view, which is formed of first, second and third rectangles, respectively referenced 252, 254 and 256. While cursor 250 moves in a manner analogous to the mouse arrow, as described, tracking the movements of the FITIS 200 (FIGS. 5A and 5B), it further provides an indication of the two-dimensional angular orientation of the FITIS, which is clearly necessary in order to enable a sighted user to visually follow the movements of the FITIS by an impaired user, on a VDU.

In view of the fact that the cursor 250 is a visual representation of the ETDs 202 (FIGS. 5A and 5B), and thus referring now also to FIG. 9, it will be appreciated that each cursor rectangle has the dimensions W×H, in which:

W=($w_i$×$S_i$) and

H=($h_i$×$S_i$), wherein i=1,2,3, and $S_i$ is a scale factor selected for $TD_i$.

In accordance with the present invention, FITIS 200 (FIGS. 5A and 5B) is also employed in a 'text' mode, for the display of text, such as in Braille. Due to the much higher density of pins in ETDs 202 than is required for the display of Braille, however, it is possible to present the information in a novel manner, and also to provide a user with additional information, at the same time.

Referring initially to FIG. 12, there is seen an ETD 202 having a generally rectangular array of pins 214, and on which eight pins, referenced 214B are seen to be shaded, these being those to be used for displaying the Braille characters, in accordance with one embodiment of the invention.

It will be appreciated however, referring briefly to FIG. 5A, that a FITIS 200 having three ETDs 202 is capable of displaying only three characters at one time. Accordingly, it is necessary to provide a text flow in which the display of text characters letters is shifted in a manner analogous to that used when a sight-impaired person 'read' normally.

This text flow can be activated in three different ways, each selectable by the user:

1. After tactile display of the first three characters of text, depression of the LEFT or RIGHT arrow buttons on the keyboard causes tactile display of a subsequent set of three characters. In this manner, the user employs one hand for 'reading' the tactile displays and the other hand for controlling the text flow.

2. Some visually impaired people prefer to read text with two hands—two index fingers, and one middle finger. In order to facilitate this, preprogrammed SDs 204 (FIGS. 5A and 5B) are used to control the text flow, in substantially the same manner as using the keyboard arrow keys, by enabling a user to control the text flow while maintaining both hands on the FITIS 200.

3. In a third control method for blind readers who prefer to move the device so as to mimic the way in which they would move their hands across a Braille text, horizontal motion only, of the FITIS 200, activates a text run. In this mode, a vertical component of the motion is preferably neutralized by the software program to prevent the reader from jumping to a different line accidentally.

A line change in all three above control modes is provided by depressing a preprogrammed one of SDs 204 (FIG. 5A and 5B), or one of the function keys, for example, on the computer keyboard.

As mentioned above, only a limited number of pins 214 are required for the display of Braille characters. Accordingly, some of the pins in each ETD can be employed so as to provide other types of information, in modes different from that of the Braille character display. This may be done, for example, by extending them to different heights, or oscillating them with different frequencies.

In the case of a running text line, as described above, using the ETDs of FITIS 200, characters appear, disappear and change rapidly. This may create some difficulties for the user, especially in early stages of use or adaptation. However, the high resolution and high pin density in the ETDs, facilitates use of the pins not used for the Braille characters, per se, for simulation of friction. Typically, this is provided by actuating the pins in oscillating fashion and so as to create the impression of a random or regular wave in a direction opposite to motion of the text.

Figure 13:
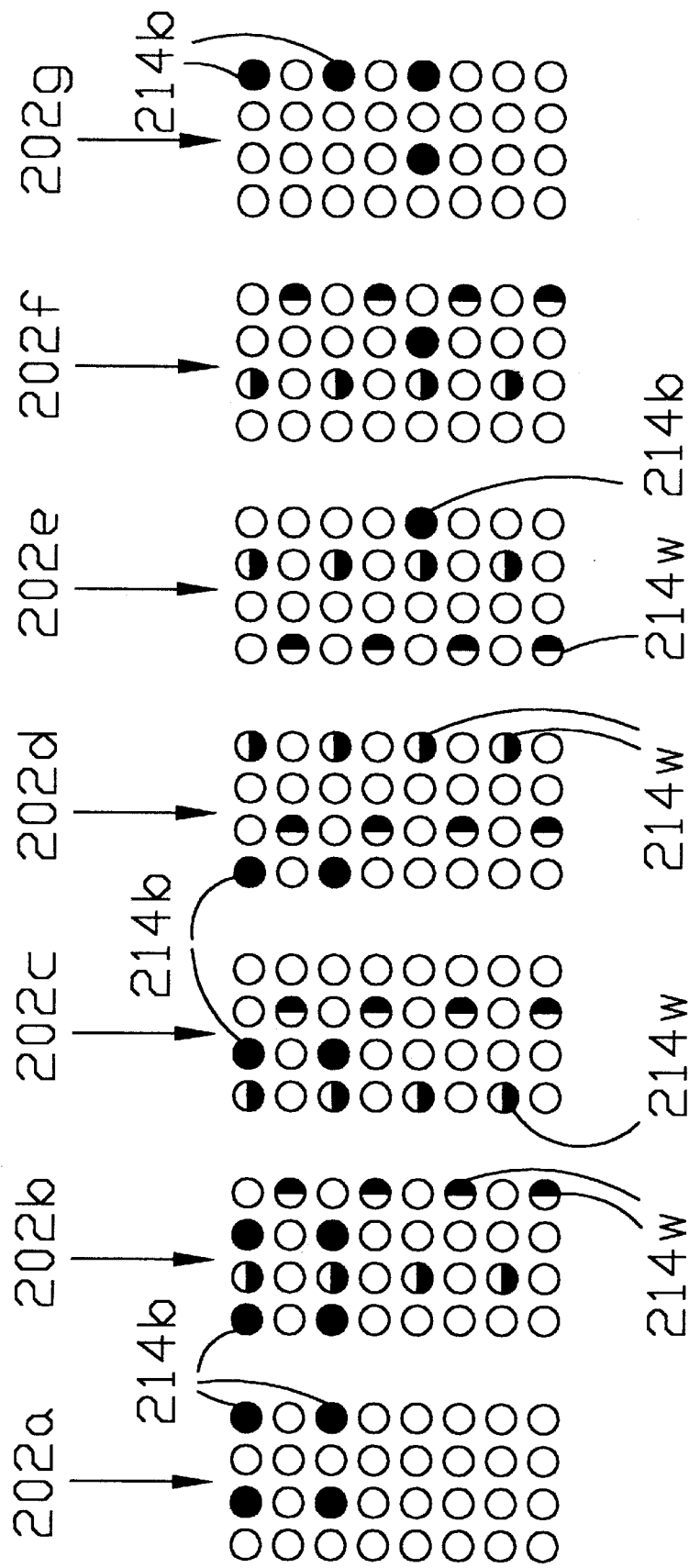
FIG. 13 shows a pin array used for the successive display of a Braille characters and the provision of a wave effect simulating the sensation of friction.

Referring now to FIG. 13, friction simulation with a regular wave is illustrated, in which a single ETD 202 is shown in a sequence of seven states, respectively referenced 202a, 202b, ..., 202g, in which the Braille character for the letter "g" is replaced by a Braille "number" character. Pins 214b employed for displaying the Braille characters are raised to their maximum, and are indicated by black circles; pins 214w employed for providing a wave are only partially raised, and are indicated by gray circles.

It is clear from the illustrated sequence that initially, in ETD state 202a, in the absence of a wave, no pins 214w are indicated; this also being the case in ETD state 202b. In ETD state 202b, however, two columns of pins have alternate pins partially raised which, s seen in ETD state 202c, are then retracted while parallel pins in the next column over, are raised. This process is seen throughout ETD states 202b–202f, providing the impression of a regular moving wave.

It is clear that an irregular or randomly generated pattern of moving pins can also be sued to create the impression of friction.

In accordance with a further embodiment of the invention, the use of pin actuation to simulate friction may also be employed in a graphic mode of operation of the system of the invention.

It is especially useful when studying a graphic object with unvarying characteristics, for example, a colored background or a large portion of an object with no graphic variation. In this case, a user scanning the area has no tactile feedback and is liable to become disoriented.

It is thus sought to solve this problem by simulating friction to represent this type of non-varying surface, for example, by providing a random intermediate height pin motion.

Figure 14A:
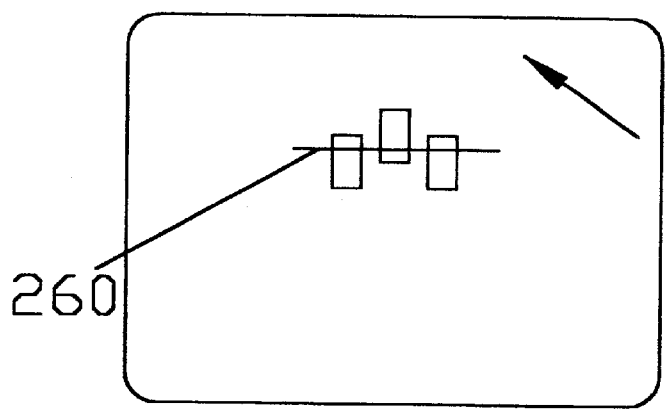
FIG. 14A and 14B show a VDU display and operation of tactile displays as the cursor is moved across a graphic object having unvarying characteristics, respectively.
Figure 14B:
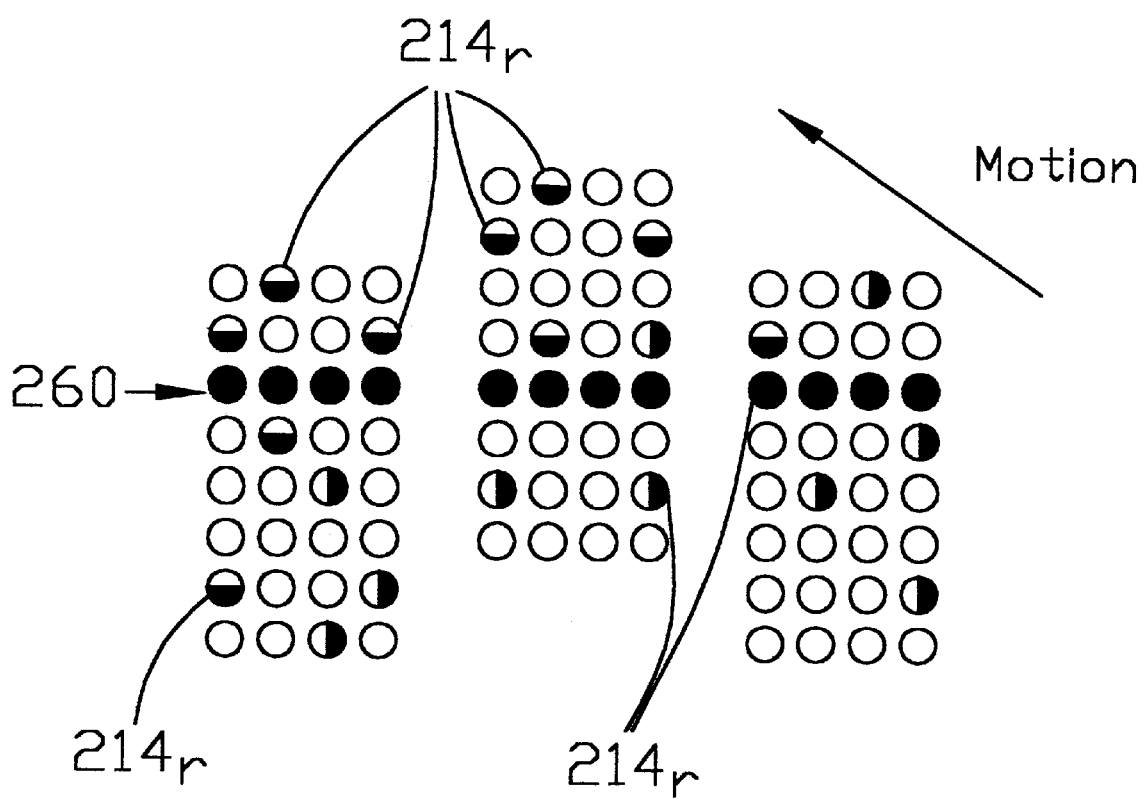

Referring now to FIGS. 14A and 14B, however, there may alternatively be provided a slight gradient as the user moves across a non-varying portion. Seen in FIG. 14B is a plurality of ETDs 202, as in the arrangement shown and described above in conjunction with FIGS. 5A and 5B, showing a freeze frame of their respective states as the FITIS cursor, represented by the three rectangles seen on the VDU display in FIG. 14A, crosses an image with a horizontal line—referenced 260—in a direction seen to be from the bottom right hand corner of the drawing to the top left hand corner thereof. Pins 214r (FIG. 14B) are selected and raised to an intermediate level, at random.

The ability to control pin behavior, as well as the plurality of available pin levels, facilitate and even accelerate the process of text reading using the system of the present invention.

In accordance with an embodiment of the present invention, there are several ways of optimizing use of the system in order to increase reading speed;

1. User selection of a working pin level, taken from the above-mentioned four levels. This is achieved by engagement of an SD 204 on FITIS 200 (FIGS. 5A and 5B) or on the keyboard, thereby to cause the EDDS to operate actuator 108 (FIG. 3) so as to change the operational height of working pins.

2. Selection of an oscillating mode with pin oscillation frequency within a predetermined touch sensible range. As known, some blind readers, when reading Braille text from regular paper or Braille display, use small scanning of fingertips around a Braille character so as to facilitate its recognition, but this slows down the reading speed. It has been found by the inventor that the vibration of pins so as to form a Braille character on an ETD, between two neighboring height levels, at a low frequency oscillation, typically in the range 3–5 Hz, facilitates rapid comprehension of the characters thus displayed, thus leading to faster reading.

A problem with Braille coding is its linear character. This creates enormous difficulties for understanding the Braille coding of a non-linear text, such as mathematical expressions including power, text including subscripts and superscripts, special fonts such as bold, italics and underlining, and so on. In the present invention, in which, as described above, only eight pins are actually required to display the Braille characters, per se, but in which a many as forty-four pins are typically provided in a single ETD 202, this problem can be solved, relatively easily.

Figure 15B:
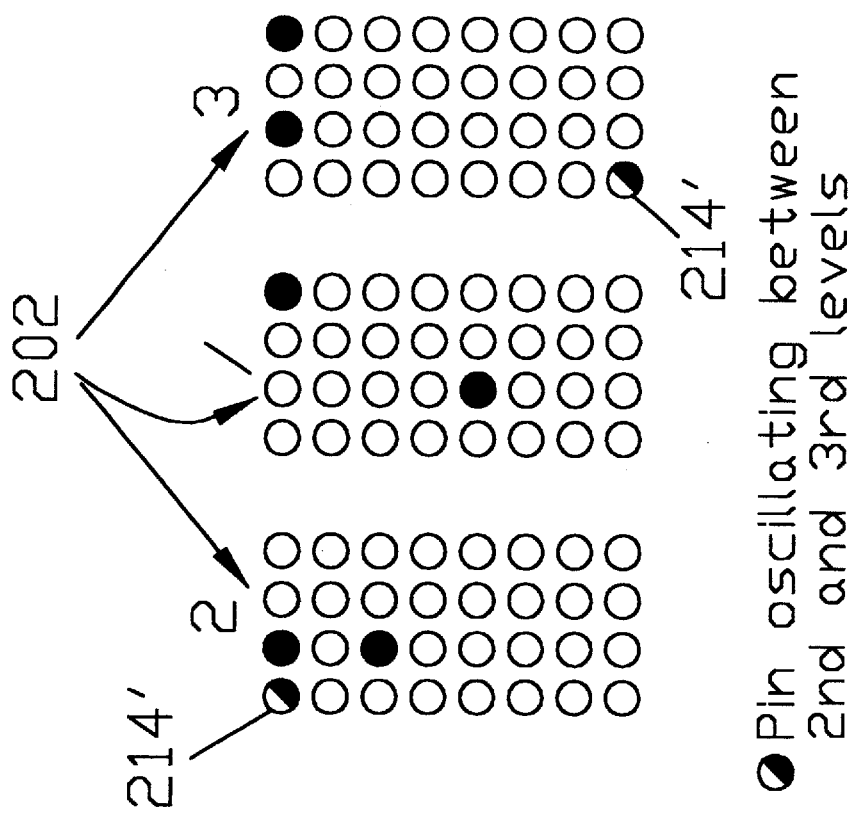
FIG. 15A and 15B show the tactile display of Braille characters in linear and in stylized form, respectively.
Figure 15A:
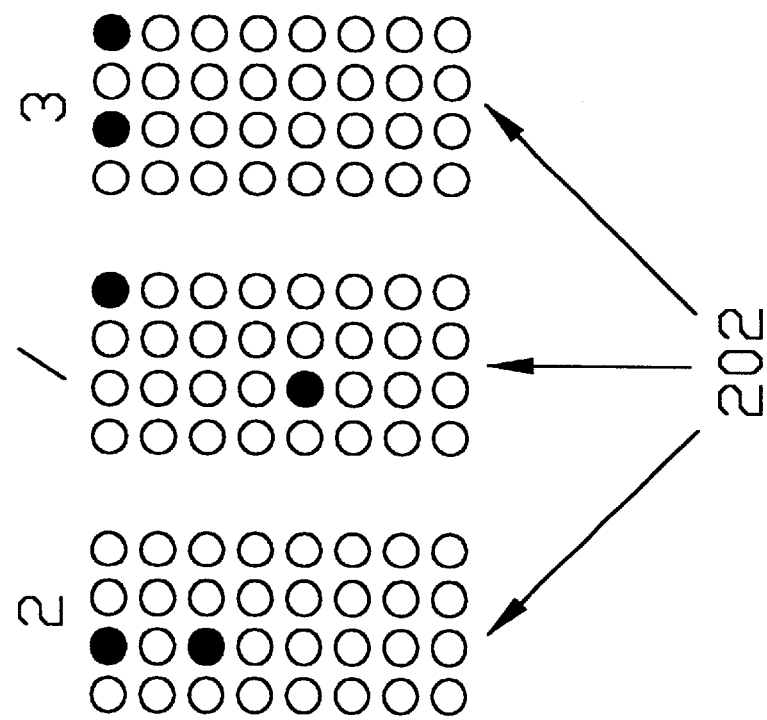

Referring now briefly to FIGS. 15A and 15B, each of the groups of ETDs 204 displays the fraction "two thirds," in numbers. In FIG. 15A, however, it is displayed in a linear fashion, i.e. 2/3, which means that the blind reader will not immediately be aware that the "text" on the display is actually a fraction. In FIG. 15B, however, with the addition of two oscillating pins 214', oscillating between the $2^{nd}$ and $3^{rd}$ levels of the 4–8 available levels, the reader is immediately alerted to the fact that that which is being displayed is, in fact, a fraction, rather than a string of numbers, in much the same fashion that, for a sighted reader, the nature of the expression is more immediately apparent when written in stylized form, i.e. ⅔, rather than 2/3.

In particular, the availability of eight alternative positions for oscillating pins so as to indicate relative levels of sub- and superscript between adjacent characters—together with the option not to provide an oscillating pin, indicating the absence of sub- or superscript—affords nine different levels of character display.

Figure 16:
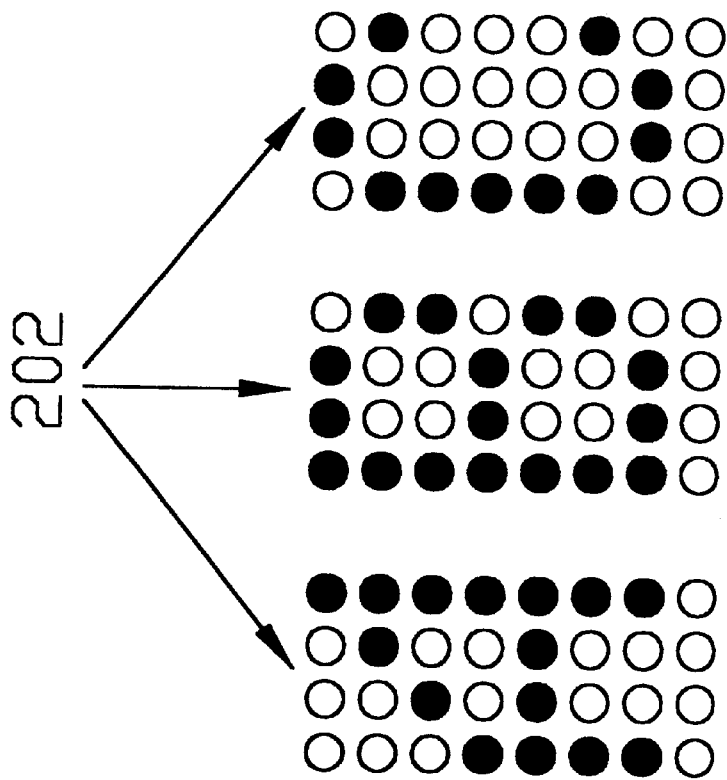
FIG. 16 illustrates the display of normal text on a tactile display of the invention.

Referring now to FIG. 16, it will be appreciated that, even beyond the ability to display Braille characters, the ETDs 202 of FITIS 200 are able, due to their large density of pins, with even a minimal array of 4×32, to display letters and other symbols in their 'normal' printed form, without having to transform them first in Braille. This is exemplified in the letters A, B and C, illustrated in the ETDs of FIG. 16.

The problem of printed letter recognition by touch can be solved by providing for the user the option of adjust fonts used for displaying letters. The font is determined by the program in the stage of preparation of array for activation of the tactile pins with a predetermined change table. Enabling the user to change the font to one with which he is comfortable, solves the problem.

Figure 17:
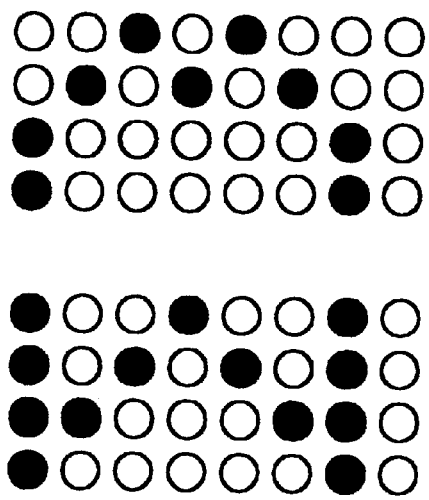
FIG. 17 illustrates the display of normal text, rotated into a sideways position, on tactile displays of the invention.

Referring now to FIG. 17, those letters requiring more than four columns, such as the Latin Characters M and W, may be displayed either in a modified fashion, or sideways, as illustrated in the drawing.

As described above, the FITIS 200 is operable in both graphic and text modes. In most conventional so-called "Windows" applications, the VDU is a complex conglomerate of graphic and text information. When a user moves the mouse cursor from a drawing (i.e. a bitmap) to text, from text to drawing, or between different window components, such as menu, scroll bars, tool bars, and so on, the operating system changes the appearance of the cursor, thereby rapidly enabling a user to understanding the information at the cursor location.

In accordance with a preferred embodiment of the invention, these same operating system commands are used in conjunction with FITIS for performing an automatic switch between text and graphic modes in accordance with the cursor position, as well as for generation of sensible signals, typically voice messages, which assist the user with regard to the current appearance of the screen.

Figure 18:
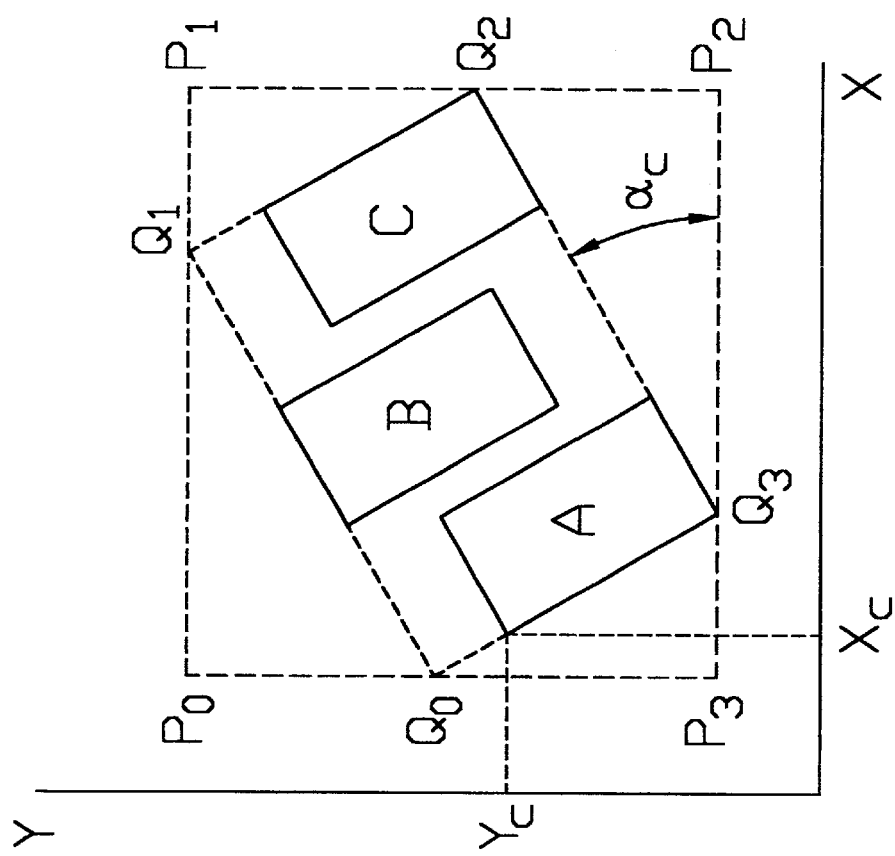
FIG. 18 illustrates extraction of graphic data from a VDU.

Referring to FIG. 18, when FITIS 200 is moved to a new position, it sends position and rotation coordinates to the EDDS. A resident computer program is provided so as to initially calculate the current position of the FITIS 200 cursor on the computer screen, namely $X_c$, $Y_c$ and $\alpha_c$, as shown in the drawing. $X_c$ and $Y_c$ are the coordinates of the hot pixel, as shown and described above in conjunction with FIG. 9, and $\alpha_c$ is calculated as a function of a line $Q_2$–$Q_3$, joining the extreme bottom corners of the cursor.

If the information is a bitmap, the program performs the following calculations:

1. Determination of a rectangular cursor envelope, defined by points $Q_0Q_1Q_2Q_3$ in accordance with the coordinates and rotation, $X_c$, $Y_c$, $\alpha_c$; the current image scale; logical spaces between fingers ($d_1$, $d_2$) (FIG. 9); and the logical heights of the middle finger ($h_1$, $h_2$) (FIG. 9).

2. Determination of an X-Y oriented rectangle $P_0P_1P_2P_3$, i.e. having sides parallel to the abscissa, and enveloping the rectangle $Q_0Q_1Q_2Q_3$.

3. Extraction of the pixel colors from the rectangle $P_0P_1P_2P_3$ to the memory array.

4. Extraction from the memory array of the colors of only those pixels which correspond to rectangles A, B and C, in accordance with factors including the current image scale; logical spaces between fingers $d_1$ and d2; and logical heights of middle finger $h_1$ and $h_2$.

5. Re-scaling, image processing procedures (if selected by user), and transformation of colors to e.g. four gray levels.

6. Provides appropriate commands to the processor 104, controllers 106 and actuators 108 (FIG. 3) of FITIS 200, regarding the appropriate pin actuation, so that the FTDs 202 display the information appropriately.

If the information is recognized as text, however, the program first, eliminates the increment of the vertical coordinate so as to determine a 'current' text line, and thereafter calculates the number of text symbols $N_T$ from $X_c$ (FIG. 18) until the end of line.

Figure 19:
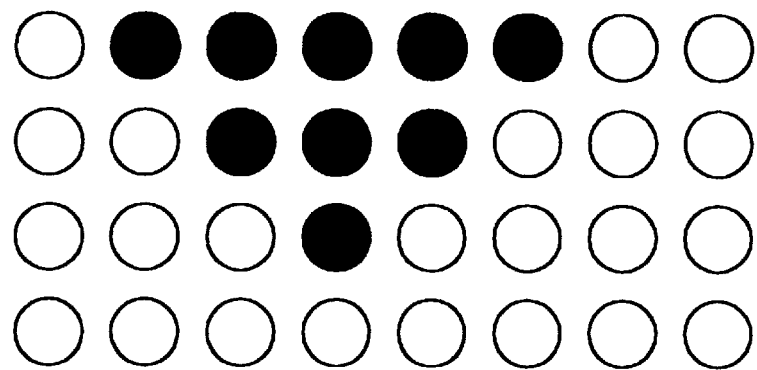
FIG. 19 illustrates a possible end character to be displayed in tactile from, signifying the end of a text line.

If $N_T \geq 3$, the three symbols immediately following the cursor position are displayed, either in Braille code or normal text characters, on the three ETDs. If $N_T < 3$, the remaining one or two characters until the end of the line are displayed, and the ETDs not having screen characters to display, are operated so as to display 'spacer' or 'end-of-line' characters, such as the sideways triangle illustrated in FIG. 19.

The above calculations and text/symbol display are performed repeatedly when the system is in text mode.

A further instance when it is required to switch between graphic and text modes is when text appears as part of drawing, in the form of bitmapped text. This is a problem peculiar to the tactile reading of an computer display, and is not a problem encountered by sighted users, as it is of no concern in merely reading the text, as to whether it is actual text or graphics.

In accordance with an embodiment of the present invention, it is possible to extract text from bitmaps by use of Optical Character Recognition algorithms, thereafter permitting display of this text, substantially as described above.

Figure 20:
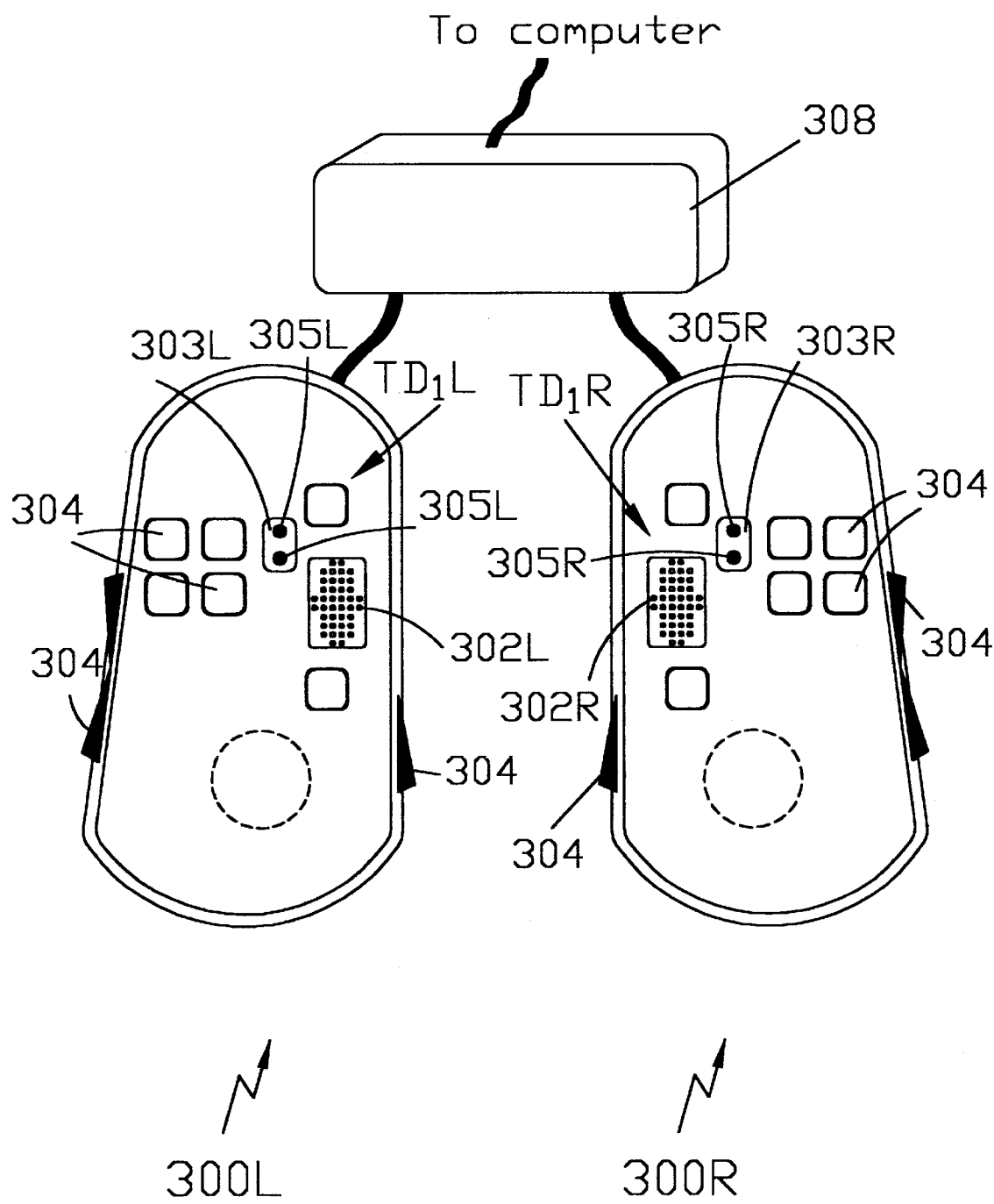
FIG. 20 illustrates a pair of Complementary Integrated Tactile displays (CITD), operative in accordance with an alternative embodiment of the present invention.
Figure 21:
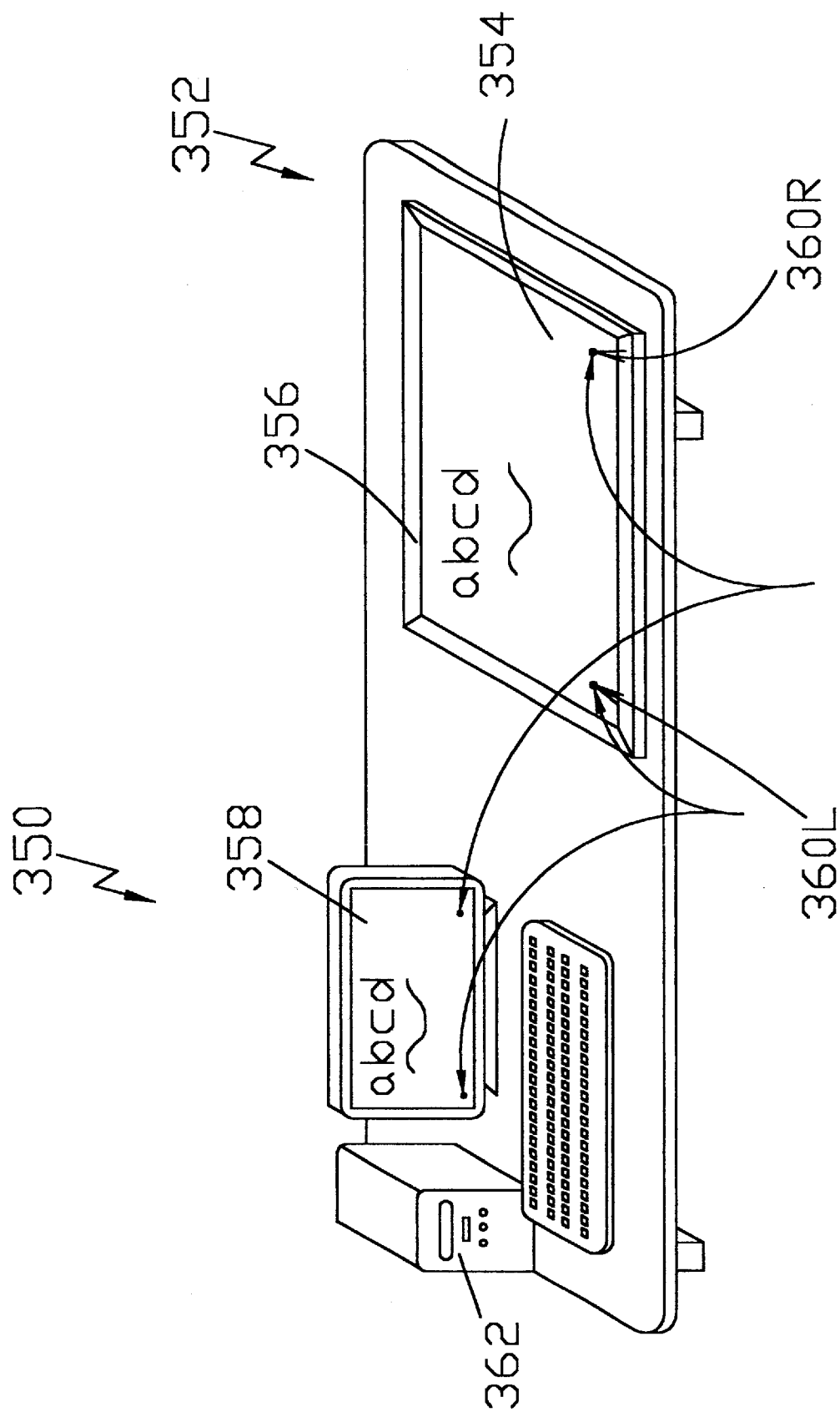
FIG. 21 illustrates use of the CITDs of FIG. 20 in conjunction with an EDDS having associated therewith a reference surface device, for maintaining coordination between the CITDs and the reference system of the EDDS.
Figure 22:
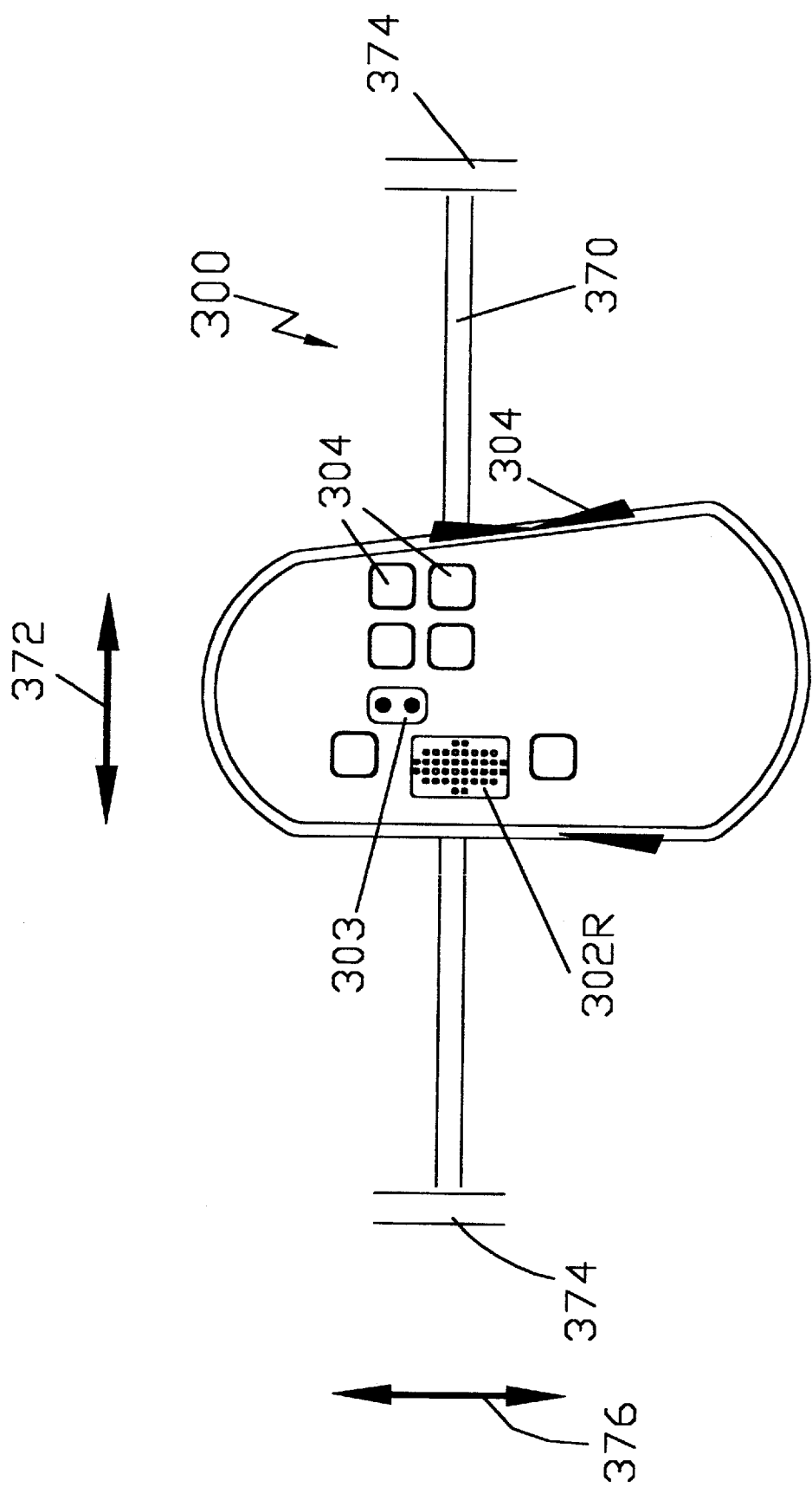
FIG. 22 shows an X-Y table construction for use in place of the reference surface device of FIG. 21.

Referring now also to FIGS. 20–22, there is provided, in accordance with an alternative embodiment of the invention, an alternative implementation of TIS 98, shown and described above on conjunction with FIG. 3, in which a pair of Complementary Integrated Tactile displays (CITD), referenced generally 300, are provided. The use of two CITDs 300 simultaneously, one in each hand, is not only convenient for many blind users who may be more comfortable using both hands simultaneously.

Each CITD 300 is mouse-like navigation device, generally similar to FITIS 200 (FIGS. 5A and 5B), is specifically made for either the right or left hand. Accordingly, the various portions of the left-handed device are denoted with reference numerals having the suffix "L", while those of the right-handed device are denoted with reference numerals having the suffix "R". Similarly, the individual devices are specifically referenced 300L and 300R.

The tracking functions of the devices are substantially as shown and described above for FITIS 200 (FIGS. 5A and 5B), and are thus not shown and described again specifically, herein. Each CITD 300 has mounted on an upper surface thereof, in convenient finger reach of a user, first and second tactile displays, referenced respectively 302 and 303. First tactile display 302 is a high pin density tactile display (HTD), and is similar in pin arrangement to any of the ETDs 202 shown and described above in conjunction with FIGS. 5A–19. Second tactile display 303 is a low pin density tactile display (LTD), having a small number of tactile members 305, for providing information or warning signals, rather than for displaying data displayed on a VDU. Tactile members 305 may be pins, such as pins 214, shown and described hereinabove, or other tactile members, providing a heat or humidity signal output to the user. There are also provided switch devices (SDs) 304, typically on the upper surface and on the side of CITDs 300, as shown. The CITDs 300L and 300R are connected via a common interface, referenced 308, to an EDDS computer, it being appreciated that interface 308 may be operative either to combine data from the two CITDs prior to providing the data to the computer processor or, alternatively, to provide the data to the computer processor from each CITD separately.

In use, the CITDs 300 may be manipulated either together or totally separately, so as to enable a user to benefit from the ability to view different portions of an MDFE, generally as described above in conjunction with FIG. 2, although only two portions may be displayed by each HTD 302 of each CITD 300. Accordingly, whereas with the FITIS 200, a single fiducial pint only exists therefor, in the present embodiment of the invention, each CITD 300 has a separate fiducial point, which must be separately determined. Tactile information for the HTDs 302 and LTDs 303 are generated in a manner similar to that described above for the FITIS 20, and is thus not described again herein, specifically.

LTDs 303 are particularly useful in graphic mode for provision of warning signals with regard to events such as approaching screen edges, navigation onto a different type of Windows System objects, including buttons, scroll bars, tool bars, list boxes, icons, and so on; differentiation between active and non-active windows, and text lines.

In text mode the presence of the pair of HTDs 302 allows for an increased reading speed, due to the ability to use the fingers of two hands, and the use of both CITDs 300 to maintain text line position in the absence of vertical motion. Furthermore, one of the LTDs 303 can be used for indicating the upcoming end of a text line, while the other can be used for actually identifying the end of a text line having been reached. A particular advantage of the use of a pair of CITDs 300, in accordance with the present embodiment of the invention, is that this facilitates certain additional aspects of the above-described information Distribution Principle (IDP). By way of example, there are well known commercial software packages, that admit access to information concerning non-visually displayed portions of objects. Typical packages include CorelDraw®, Adobe® PhotoShop®, and Autocad®.

Use of any of these or other similar software packages, in combination with the tactile display capabilities of the present invention, facilities the 3-D touch display of different sides of an object simultaneously. Clearly, while this is also possible on the FITIS 200, it is particularly advantageous in the present embodiment, in which each of the user's hands operates a separate device.

It will also be appreciated, however, that the ability to touch a 3-D graphic object is useful also to sighted users, as well as to sight-impaired users.

As known, the navigational devices of the invention operate on the principle of a position which is relative to a fiducial point, which may be zeroed at any absolute location of the devices, by the user.

Referring now to FIG. 21, in order to compensate for a certain disorientation, especially by a blind user, which may occur during some applications of the CITDs 300, however, there may be provided, in conjunction with computer apparatus, seen generally at 350, a reference surface device, referenced 352, may be provided. Reference surface device is formed of a flat travel surface 354 which is bounded by a border element 356. Travel surface 354 corresponds to the VDU 358 and has two easily locatable reference points at which the left and right CITDs can be zeroed, thereby providing the two CITDs with a mutual reference system, which is important for a sight impaired user using the system. Preferably, the reference points are bottom left and bottom right points of the travel surface 354, seen at 360L and 360R, and have similar predetermined spatial relationships with the hot point of HTD 302 of each CITD 300 (FIG. 20). Positioning of the CITDs 300 at corners of the travel surface 354 is facilitated particularly by the border element 356, which is typically a raised edge portion against which CITDs 300 can be placed in abutting relation therewith. The CITDs 300 are zeroed at these positions by placing the device thereat and sending an appropriate signal input to the computer 362, via one or more predetermined SDs 304.

Referring now to FIG. 22, there is provided an alternative system for maintaining correspondence of the CITDs 300 with the VDU display. The system is essentially a form of X-Y table, and has a rail or other rod-like 'X' mounting member 370 onto which CITD 300 is mounted for parallel motion only therealong, in an X direction, as indicated by double headed arrow 372. Member 370 is mounted, in turn, onto a Y guide, which may be any sort of supports, referenced 374, which permit motion of X mounting member 370 in a Y direction only, as indicated by double headed arrow 376, normal to the X direction.

It will be appreciated that additional ETDs may be provided onto CITDs 300, thereby to increase the utility thereof for both text and graphics, as well as the ability to maneuver in a multiple data environment.

It will be appreciated by persons skilled in the art that the scope of the present invention is not limited to what has been specifically shown and described hereinabove, merely by way of illustrative example. Rather, the scope of the present invention is limited solely by the claims which follow.

What is claimed is:

1. An electronic data display system (EDDS) which includes:
    a computer system for containing a multiple data field environment (MDFE) including portions of displayable data;
    at least first and second data selection apparatuses, associated with said computer system, for selecting data from different portions of the MDFE for display;
    at least first and second tactile displays for displaying data contained within the MDFE, capable of simultaneously displaying data selected from different portions of the MDFE; and
    software for extraction of the different selected portions of data, and for transforming the extracted data for simultaneous display by said at least first and second tactile displays.

2. An EDDS according to claim 1, and including at least one switch device for enabling the input of commands into said computer system in association with the selected portion of the MDFE.

3. An EDDS according to claim 1, wherein said software is further operable to transform the extracted data into at least one format selected from a predetermined group of formats.

4. An EDDS according to claim 3, wherein said predetermined group of formats includes:
    color formats;
    graphic formats;
    text formats;
    font formats;
    one to one two-dimensional geometrical formats;
    resized, scaled formats;
    morphological formats;
    image enhancement formats;
    running text format; and
    running text format with frictional motion simulation.

5. A method of tactile display of data forming part of a MDFE stored in a computer memory, which includes:
    selecting different portions of data from the computer memory;
    extracting the different selected portions of data;
    transforming the extracted data into a selected format;
    providing the transformed data to at least first and second tactile displays; and
    operating the at least first and second tactile displays so as to display thereat the transformed data corresponding to the data selected from different portions of the computer memory, simultaneously.

6. A method according to claim 5, and also including the step of entering commands into the computer system in association with the selected data.

7. A method according to claim 5, and wherein said step of transforming the extracted data into a selected format includes the step of transforming the extracted data into a format selected from a predetermined group of formats.

8. A method according to claim 7, wherein, in said step of transforming, said predetermined group of formats includes:
    color formats;
    graphic formats;
    text formats;
    font formats;
    one to one two-dimensional geometrical formats;
    resized, scaled formats;
    morphological formats;
    image enhancement formats;
    running text format; and
    running text format with frictional motion simulation.

9. An interface device for communicating with a computer which provides to a user access to a computer system containing a multiple data field environment (MDFE), said interface device including:
    a navigation device which includes:
        a housing, and apparatus for sensing a position of the housing relative to an initial position on a planar surface adjacent to an underside of housing, along which said navigation device is moved;
    apparatus for providing the sensed position to the computer, wherein the position of said navigation device with respect to data stored in the computer is represented therein by a fiducial point;
    software for extracting different portions of data associated with the fiducial point, and for transforming the extracted data into a selected format; and
    at least first and second tactile displays mounted onto said housing, operable to receive the formatted data and capable of displaying simultaneously the different portions of data in the selected format thereof.

10. An interface according to claim 9, and further including at least one switch device for enabling the input of commands into said computer system in association with the selected portions of the MDFE.

11. An interface device according to claim 10, and also including apparatus for selectably adjusting the position of at least one of said at least first and second tactile displays, with respect to said housing.

12. An interface device according to claim 9, wherein said software is operable to transform the extracted data into at least one format selected from a predetermined group of formats.

13. An interface device according to claim 12, wherein said predetermined group of formats includes:

color formats;

graphic formats;

text formats;

font formats;

one to one two-dimensional geometrical formats;

resized, scaled formats;

morphological formats;

image enhancement formats;

running text format; and running text format with frictional motion simulation.

* * * * *